US012493213B2

United States Patent
Yoo et al.

(10) Patent No.: US 12,493,213 B2
(45) Date of Patent: Dec. 9, 2025

(54) DISPLAY APPARATUS

(71) Applicant: SAMSUNG ELECTRONICS CO., LTD., Suwon-si (KR)

(72) Inventors: Yongsung Yoo, Suwon-si (KR); Jungmin An, Suwon-si (KR); Dahoon Won, Suwon-si (KR); Dongjung Yun, Suwon-si (KR); Youngwook Jung, Suwon-si (KR); Minnyeong Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/890,399

(22) Filed: Sep. 19, 2024

(65) Prior Publication Data

US 2025/0102859 A1    Mar. 27, 2025

Related U.S. Application Data

(63) Continuation of application No. PCT/KR2024/012407, filed on Aug. 21, 2024.

(30) Foreign Application Priority Data

Sep. 27, 2023  (KR) .................. 10-2023-0131105

(51) Int. Cl.
 *G02F 1/13357*   (2006.01)
(52) U.S. Cl.
 CPC .. *G02F 1/133605* (2013.01); *G02F 1/133603* (2013.01)
(58) Field of Classification Search
 CPC ............ G02F 1/133605; G02F 1/133603
 See application file for complete search history.

(56) References Cited

U.S. PATENT DOCUMENTS

| 9,894,766 B2 | 2/2018 | Park et al. |
| 10,466,536 B2 | 11/2019 | Yamano et al. |

(Continued)

FOREIGN PATENT DOCUMENTS

| CN | 203349160 U | 12/2013 |
| EP | 4 024 127 B1 | 11/2023 |

(Continued)

OTHER PUBLICATIONS

International Search Report (PCT/ISA/210) and Written Opinion (PCT/ISA/237) issued on Dec. 11, 2024 by the International Searching Authority in International Patent Application No. PCT/KR2024/012407.

*Primary Examiner* — Elmito Breval
(74) *Attorney, Agent, or Firm* — Sughrue Mion, PLLC

(57) ABSTRACT

Provided is a display apparatus including: a display panel; a plurality of light sources configured to radiate light onto the display panel; and a reflective sheet including a central area, a middle area outward from the central area, an edge area outward from the middle area, and a plurality of holes corresponding to positions of the plurality of light sources, wherein the reflective sheet is configured to reflect the light radiated from the plurality of light sources toward the display panel, wherein the plurality of holes includes a first hole in the middle area, a second hole in the central area, and a third hole in the edge area, and wherein a size of the first hole is larger than a size of the second hole and a size of the third hole.

20 Claims, 14 Drawing Sheets

(56) References Cited

U.S. PATENT DOCUMENTS

| | | | |
|---|---|---|---|
| 11,003,022 B2 | 5/2021 | Kim et al. | |
| 11,204,523 B2 | 12/2021 | Kobayashi | |
| 2021/0088852 A1* | 3/2021 | Kim | G02F 1/133611 |
| 2023/0106059 A1 | 4/2023 | Yang et al. | |

FOREIGN PATENT DOCUMENTS

| | | |
|---|---|---|
| JP | 2021-139938 A | 9/2021 |
| KR | 10-2016-0131549 A | 11/2016 |
| KR | 10-2019-0102444 A | 9/2019 |
| KR | 10-2022-0100840 A | 7/2022 |
| KR | 10-2448600 B1 | 9/2022 |
| KR | 10-2023-0047257 A | 4/2023 |
| WO | 2010/084649 A1 | 7/2010 |
| WO | 2017/110013 A1 | 6/2017 |

* cited by examiner

DISPLAY APPARATUS

CROSS-REFERENCE TO RELATED APPLICATIONS

This application is a by-pass continuation of International Application No. PCT/KR2024/012407, filed on Aug. 21, 2024, which is based on and claims priority to Korean Patent Application No. 10-2023-0131105, filed on Sep. 27, 2023, in the Korean Intellectual Property Office, the disclosures of which are incorporated by reference herein in their entireties.

BACKGROUND

1. Field

The present disclosure relates to a display apparatus.

2. Description of Related Art

A display apparatus is an output apparatus that converts electrical information into visual information and displaying the visual information for users to view. The display apparatus may be used in various fields, such as homes, businesses, etc.

Display apparatuses include a monitor connected to a personal computer, a server computer, etc., a portable terminal (for example, a portable computer, a navigation terminal, a general television, an Internet Protocol television (IPTV), a smart phone, a tablet PC, Personal Digital Assistant (PDA), or a cellular phone), various display apparatuses used for reproducing images such as advertisements or movies in industrial sites, or other various kinds of audio/video systems.

A display apparatus may include a light source module for converting electrical information into visual information, and the light source module includes a plurality of light sources for emitting light independently.

The plurality of light sources may include, for example, Light Emitting Diodes (LEDs) or Organic Light Emitting Diodes (OLEDs). For example, the LEDs or OLEDs may be mounted on a circuit board or a substrate.

Display apparatuses are generally classified into a self-emissive type using a display panel such as Organic Light Emitting Diodes (OLEDs) which itself emits light, and a non-emissive type using a display panel such as a Liquid Crystal Display (LCD) which receives light from a backlight unit without itself emitting light.

Backlight units are generally classified into a direct type in which light sources are positioned behind a display panel, and an edge type in which light sources are positioned at sides of a display panel, according to the positions of light sources.

SUMMARY

Provided is a display apparatus with an improved structure for gradually reducing brightness from a central area of a screen toward edge areas of the screen.

Also provided is a display apparatus with an improved structure for improving brightness uniformity in edges areas of a screen.

Also provided is a display apparatus with an improved structure for preventing excessive brightness deterioration in edges areas of a screen.

The disclosure is not limited to the above-mentioned embodiments, and other aspects not mentioned will be clearly understood by one of ordinary skill in the technical art to which the disclosure belongs from the following description.

According to an aspect of the disclosure, a display apparatus may include: a display panel; a plurality of light sources configured to radiate light onto the display panel; and a reflective sheet including a central area, a middle area outward from the central area, an edge area outward from the middle area, and a plurality of holes corresponding to positions of the plurality of light sources. The reflective sheet may be configured to reflect the light radiated from the plurality of light sources toward the display panel. The plurality of holes may include a first hole in the middle area, a second hole in the central area, and a third hole in the edge area, and wherein a size of the first hole is larger than a size of the second hole and a size of the third hole.

The middle area may be along an edge of the central area. The plurality of holes may further include a plurality of middle holes including the first hole, and the plurality of middle holes may be in the middle area. A size of each of the plurality of middle holes may be larger than the size of the second hole and the size of the third hole.

The edge area may be along an edge of the reflective sheet, The plurality of holes may further include a plurality of edge holes including the third hole, and the plurality of edge holes may be in the edge area. A size of each of the plurality of edge holes may be smaller than the size of the first hole.

The size of the second hole and the size of the third hole may be the same.

The size of the third hole may be smaller than the size of the second hole.

The edge area may be along an edge of the reflective sheet. The plurality of holes may further include a plurality of edge holes including the third hole, and the plurality of edge holes may be in the edge area. A size of each of the plurality of edge holes may be smaller than the size of the second hole.

The middle area may include: a first middle area; and a second middle area positioned outward from the first middle area. The plurality of holes may further include: a first middle hole in the first middle area, wherein a size of the first middle hole is larger than the size of the second hole and the size of the third hole; and a second middle hole in the second middle area, wherein a size of the second middle hole is larger than the size of the first middle hole.

The second middle area may be between the first middle area and the edge area.

The first middle area and the second middle area may be provided along a circumferential direction of the reflective sheet. The second middle area may surround an edge of the first middle area.

The edge area may include: a first edge area; and a second edge area located outward from the first edge area. The plurality of holes may further include: a first edge hole in the first edge area, wherein a size of the first edge hole may be smaller than the size of the first hole; and a second edge hole in the second edge area, wherein a size of the second edge hole may be smaller than the size of the first edge hole.

The size of the first edge hole may be smaller than the size of the second hole.

The first edge area and the second edge area may be provided along a circumferential direction of the reflective sheet. The second edge area may surround an edge of the first edge area.

The middle area may include four corner areas. Each of the four corner areas may be provided between a corresponding vertex among four vertices of the central area and a corresponding vertex among four vertices of the edge area. The plurality of holes may further include a plurality of corner holes positioned in the four corner areas. A size of each of the plurality of corner holes may be larger than the size of the second hole and the size of the third hole.

The size of the second hole, the size of the third hole, and a size of a hole in a portion of the middle area excluding the four corner areas may be the same.

Each of the four corner areas may include a corner region including a group of corner holes, from among the plurality of corner holes, arranged in three columns and three rows.

According to an aspect of the disclosure, a display apparatus may include: a display panel; a plurality of light sources configured to radiate light onto the display panel; and a reflective sheet including: a central area; a middle area surrounding the central area, wherein the middle area includes a first middle area and a second middle area, and the second middle area surrounds the first middle area; an edge area surrounding the middle area, wherein the edge area includes a first edge area and a second edge area, and the second edge area surrounds the first edge area; and a plurality of holes corresponding to positions of the plurality of light sources. The reflective sheet may be configured to reflect the light radiated from the plurality of light sources toward the display panel. The second middle area may be between the first middle area and the edge area, and the first edge area is between the middle area and the second edge area. The plurality of holes may include a first hole in the middle area, a second hole in the central area, and a third hole in the edge area. A size of the first hole may be larger than a size of the second hole and a size of the third hole.

The plurality of holes may further include a plurality of middle holes including the first hole, the plurality of middle holes may be in the middle area, and a size of each of the plurality of middle holes may be larger than the size of the second hole and the size of the third hole.

The plurality of holes may further include a plurality of edge holes including the third hole, wherein the plurality of edge holes are in the edge area, and a size of each of the plurality of edge holes may be smaller than the size of the first hole.

The middle area may further include four corner areas. Each of the four corner areas may be provided between a corresponding vertex among four vertices of the central area and a corresponding vertex among four vertices of the edge area. The plurality of holes may further include a plurality of corner holes positioned in the four corner areas. A size of each of the plurality of corner holes may be larger than the size of the second hole and the size of the third hole.

According to an aspect of the disclosure, a reflective sheet may include: a central area, a middle area outward from the central area, an edge area outward from the middle area, and a plurality of holes corresponding to positions of a plurality of light sources of a display apparatus. The reflective sheet may be configured to reflect the light radiated from the plurality of light sources toward a display panel of the display apparatus. The plurality of holes may include a first hole in the middle area, a second hole in the central area, and a third hole in the edge area. A size of the first hole may be larger than a size of the second hole and a size of the third hole.

According to an aspect of the disclosure, a display apparatus may include: a display panel, a plurality of light sources configured to irradiate light onto the display panel, and a reflective sheet including a plurality of holes according to positions of the plurality of light sources and configured to reflect light irradiated from the plurality of light sources toward the display panel. The plurality of holes may include a plurality of central holes positioned in a center portion of the reflective sheet, a plurality of middle holes positioned outward from the plurality of central holes, wherein a size of each of the plurality of middle holes is larger than a size of a central hole among the plurality of central holes, and a plurality of edge holes positioned outward from the plurality of middle holes, wherein a size of an edge hole among the plurality of edge holes is smaller than a size of a middle hole among the plurality of middle holes.

According to an aspect of the disclosure, a display apparatus may include: a display case, a plurality of light sources supported by the display case, and a reflective sheet including a plurality of holes according to positions of the plurality of light sources and configured to reflect light emitted from the plurality of light sources, the reflective sheet being positioned inside the display case. The reflective sheet may include a central area, an edge area provided along inner edges of the display case, and a middle area positioned between the central area and the edge area. A size of a hole provided in the middle area may be larger than a size of a hole provided in the central area and a size of a hole provided in the edge area.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1:
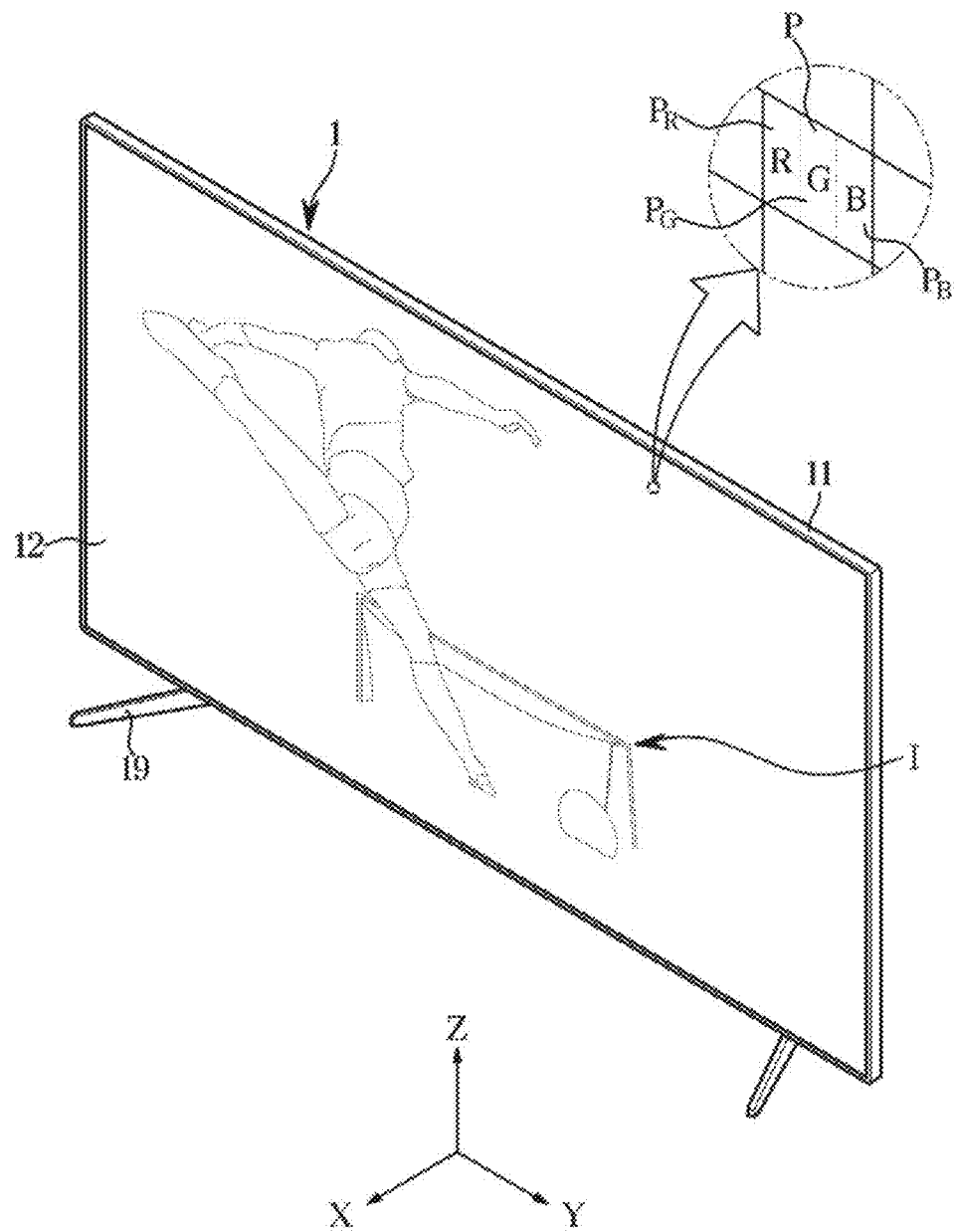
FIG. 1 shows a display apparatus according to one or more embodiments of the disclosure.

Configurations illustrated in the embodiments and the drawings described in the present specification are only example embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Singular forms of nouns corresponding to items may include one or more of the items, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, the terms "portion", "part, "module, or "member" may be implemented as software or hardware, and according to embodiments, a plurality of "portions", "parts, "modules, or "members" may be implemented as a single component, or a single "portion", "part, "module, or "member" may include a plurality of components.

Also, the terms used in the present specification are merely used to describe the embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

It will be understood that, although the terms "first", "second", etc., may be used herein to describe various components, these components should not be limited by these terms. The above terms are used only to distinguish one component from another. For example, a first component discussed below could be termed a second component, and similarly, a second component may be termed a first component without departing from the scope of right of the disclosure. As used herein, the term "and/or" includes any and all combinations of one or more of the associated listed items.

A certain (e.g., a first) component is referred to as "coupled" or "connected" with or without the terms "functionally" or "communicatively" to another (e.g., second) component. When mentioned, it means that any of the above components can be connected to the other components directly (e.g., by wire), wirelessly, or via a third component.

It will be understood that when a certain component is referred to as being "connected to", "coupled to", "supported by" or "in contact with" another component, it can be directly or indirectly connected to, coupled to, supported by, or in contact with the other component. When a component is indirectly connected to, coupled to, supported by, or in contact with another component, it may be connected to, coupled to, supported by, or in contact with the other component through a third component.

It will also be understood that when a certain component is referred to as being "on" or "over" another component, it can be directly on the other component or intervening components may also be present.

In the following description, the terms "upper-lower direction", "front-rear direction", etc. are defined based on the drawings, and the shape and position of each component are not limited by these terms. For example, the terms "front" and "rear" may be defined based on an X direction shown in the drawings. The terms "upper" and "lower" may be defined based on a Z direction shown in the drawings. The terms "left" and "right" may be defined based on a Y direction shown in the drawings. The term "vertical direction" may mean the Z direction shown in the drawings, and the term "horizontal direction" may mean the Y direction shown in the drawings.

Hereinafter, one or more embodiments of the disclosure will be described in detail with reference to the accompanying drawings.

FIG. 1 shows a display apparatus according to one or more embodiments of the disclosure.

Referring to FIG. 1, a display apparatus 1 according to one or more embodiments of the disclosure may process an image signal received from outside and visually display a processed image. FIG. 1 shows an example in which the display apparatus 1 is a television. However, the display apparatus 1 is not limited to a television. For example, the display apparatus 1 may be implemented as various types, such as a monitor as a kind of a computer output device, a portable multimedia device, a portable communication device, etc. That is, the type of the display apparatus 1 is not limited as long as the display apparatus 1 is capable of visually displaying images.

Also, the display apparatus 1 may be a Large Format Display (LFD) that is installed outdoor, such as the roof of a building or a bus stop. Herein, the outdoor is not necessarily limited to outside, and the display apparatus 1 according to one or more embodiments of the disclosure may be installed at any place where many people come in and out, such as subway stations, shopping malls, movie theaters, places of business, stores, etc., although the place is indoor.

FIG. 1 shows an example in which the display apparatus 1 is a flat panel display apparatus with a flat screen. However, the display apparatus 1 is not limited to a flat panel display apparatus. A display apparatus according to the disclosure may be a curved display apparatus or a bendable or flexible display apparatus capable of changing between a flat state and a curved state. Also, a configuration of the disclosure may be applied to various shapes of display apparatuses regardless of screen sizes or aspect ratios of the display apparatuses.

The display apparatus 1 may receive content including a video signal and an audio signal from various content sources, and output video and audio corresponding to the video signal and the audio signal. For example, the display apparatus 1 may receive content data through a broadcasting reception antenna or a wired cable, receive content data from a content reproducing apparatus, or receive content data from a content providing server of a content provider.

The display apparatus 1 may display an image corresponding to video data, and output sound corresponding to audio data. For example, the display apparatus 1 may restore a plurality of image frames included in video data and successively display the plurality of image frames. Also, the display apparatus 1 may restore an audio signal included in audio data and successively output sound according to the audio signal.

As shown in FIG. 1, the display apparatus 1 may include a main body 11 and a screen 12 for displaying an image I.

The display apparatus 1 may be installed in a standing type on an indoor/outdoor floor or furniture, or in a wall-mounted type on a wall or inside a wall. For example, the display apparatus 1 may include a supporting leg 19 provided at a lower portion of the main body 11 to be installed in a standing type on an indoor/outdoor floor or furniture.

The main body 11 may form an outer appearance of the display apparatus 1. Inside the main body 11, components for enabling the display apparatus 1 to perform various functions such as displaying an image I may be installed.

The display apparatus 1 may display an image I. More specifically, the screen 12 may be formed on a front surface of the main body 11, and the display apparatus 1 may display an image I through the screen 12. For example, the screen 12 may display a still image or a moving image. Also, the screen 12 may display a two-dimensional plane image or a three-dimensional stereoscopic image using a user's binocular disparity.

In the screen 12, a plurality of pixels P may be formed. An image I displayed on the screen 12 may be formed by light emitted from the plurality of pixels P. For example, light emitted from the plurality of pixels P may be combined like a mosaic to form an image I on the screen 12.

Each of the plurality of pixels P may emit light of various brightness and various colors. More specifically, each of the plurality of pixels P may include sub pixels PR, PG, and PB, and each of the sub pixels PR, PG, and PB may include a red sub pixel PR capable of emitting red light, a green sub pixel PG capable of emitting green light, and a blue sub pixel PB capable of emitting blue light. For example, the red light may correspond to light of a wavelength range from about 620 nm (nanometer, one billionth of a meter) to about 750 nm, the green light may correspond to light of a wavelength range from about 495 nm to about 570 nm, and the blue light may correspond to light of a wavelength range from about 450 nm to about 495 nm.

Each of the plurality of pixels P may emit light of various brightness and various colors by a combination of light emitted from the red sub pixel PR, the green sub pixel PG, and the blue sub pixel PB.

Figure 2:
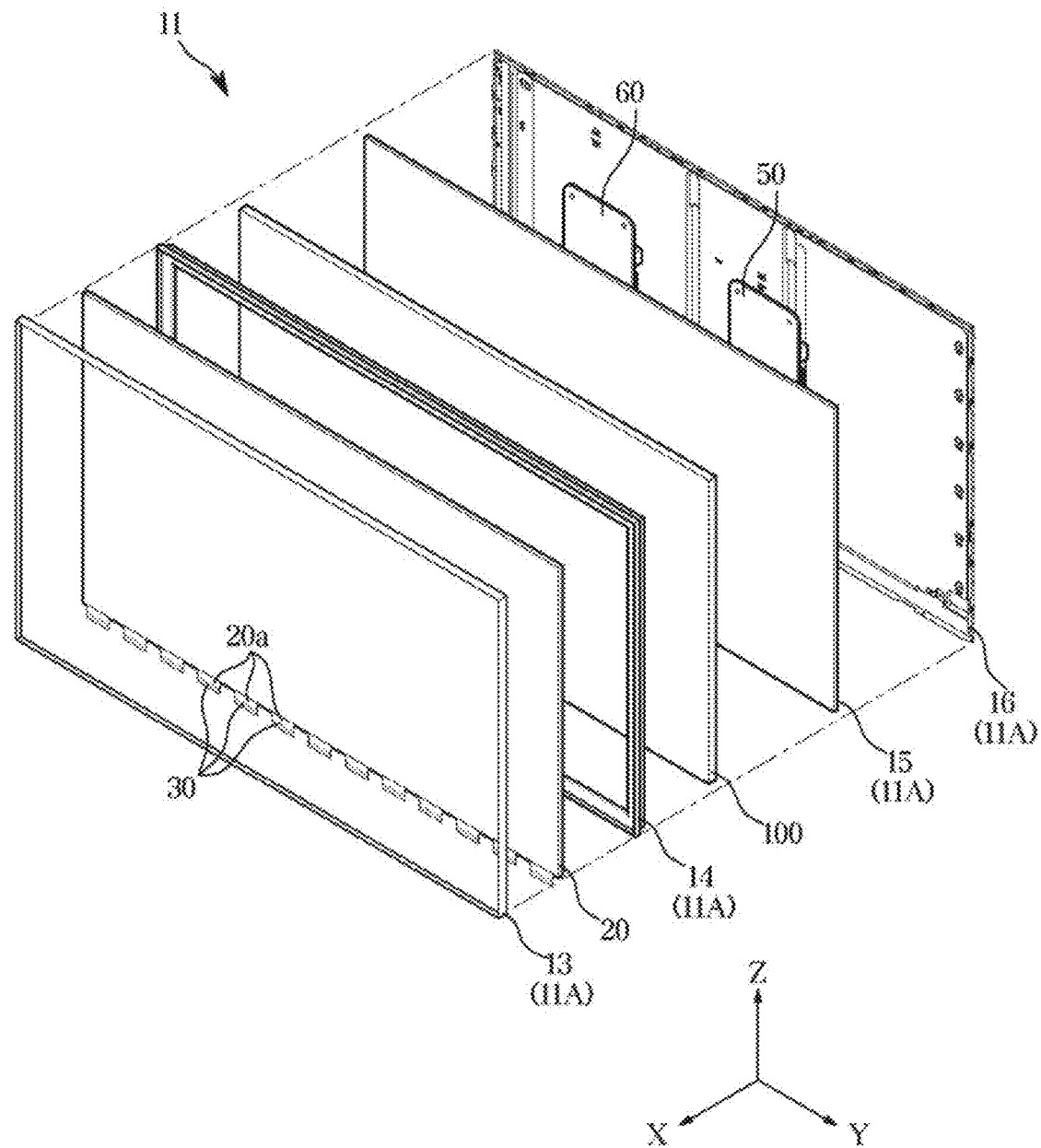
FIG. 2 is an exploded view of a display apparatus according to one or more embodiments of the disclosure.

FIG. 2 is an exploded view of a display apparatus according to one or more embodiments of the disclosure.

Referring to FIG. 2, inside the main body 11 of the display apparatus 1 according to one or more embodiments of the disclosure, various components for generating an image I on the screen 12 may be installed.

For example, the display apparatus 1 may include a display panel 20. The display panel 20 may be installed in the main body 11. The display panel 20 may display an image I. The screen 12 described with reference to FIG. 1 may be formed on a front surface of the display panel 20.

For example, the display panel 20 may have a substantially rectangular shape. More specifically, a length of horizontal sides of the display panel 20 may be different from a length of vertical sides of the display panel 20. That is, the display panel 20 may have long sides and short sides. The display panel 20 may be in a shape of a rectangular plate, although not limited thereto. However, the display panel 20 may be in a shape of a square plate of which the long and short sides have the substantially same length.

The display panel 20 may have various sizes. Also, a ratio of the shorter sides to the longer sides of the display panel 20 may be an arbitrary ratio, instead of general ratios such as 16:9 or 4:3.

In the display apparatus 1 according to one or more embodiments of the disclosure, the display panel 20 may be a non-emissive display panel such as a Liquid Crystal Display (LCD).

In one side of the display panel 20, a cable 20a for transmitting image data to the display panel 20, and a display driver integrated circuit (DDI) (hereinafter, referred to as a "driver IC") 30 for processing digital image data and outputting an analog image signal may be provided.

The cable 20a may electrically connect a control assembly 50 or a power supply assembly 60 to the driver IC 30, and also, electrically connect the driver IC 30 to the display panel 20. The cable 20a may include a flexible flat cable or a film cable.

The driver IC 30 may receive image data and power from the control assembly 50 or the power supply assembly 60 through the cable 20a, and transmit image data and driving current to the display panel 20 through the cable 20a.

Also, the cable 20a and the driver IC 30 may be implemented as a film cable, a chip on film (COF), a tape carrier packet (TCP), etc. In other words, the driver IC 30 may be positioned on the cable 20a, although not limited thereto. Also, the driver IC 30 may be positioned on the display panel 20.

A structure of the display panel 20 will be described in detail, below.

The display apparatus 1 may include a backlight unit 100 for irradiating light toward the display panel 20. The backlight unit 100 may be provided in the main body 11. The backlight unit 100 may be positioned behind the display panel 20 to irradiate light toward a front direction in which the display panel 20 is positioned. More specifically, the backlight unit 100 may be configured with a surface light source. The display panel 20 may block or transmit light emitted from the backlight unit 100.

The backlight unit 100 may include a point light source for emitting monochromatic light or white light, and may refract, reflect, and scatter light to convert light emitted from the point light source into uniform surface light. The backlight unit 100 may emit uniform surface light toward the front direction by refracting, reflecting, and scattering light emitted from the point light source.

A configuration of the backlight unit 100 will be described in detail, below.

The display apparatus 1 may include the control assembly 50 for controlling operations of the backlight unit 100 and the display panel 20, and the power supply assembly 60 for supplying power to the backlight unit 100 and the display panel 20. The control assembly 50 and the power supply assembly 60 may be provided in the main body 11.

For example, the control assembly 50 may include a control circuit for controlling operations of the display panel 20 and the backlight unit 100. The control circuit may process image data received from an external content source, transmit the image data to the display panel 20, and transmit dimming data to the backlight unit 100.

For example, the power supply assembly 60 may supply power to the display panel 20 and the backlight unit 100 such that the backlight unit 100 outputs surface light and the display panel 20 blocks or transmits light emitted from the backlight unit 100.

The control assembly 50 and the power supply assembly 60 may be implemented as a printed circuit board and various circuits mounted on the printed circuit board. For example, a power circuit may include a condenser, a coil, a resistor, a processor, and a power circuit substrate on which the condenser, the coil, the resistor, and the processor are mounted. Also, the control circuit may include a memory, a processor, and a control circuit substrate on which the memory and the processor are mounted.

The display apparatus 1 may include a display case 11A that supports various components of the main body 11 of the display apparatus 1. In other words, the various components of the main body 11 may be accommodated inside the display case 11A. The display case 11A may form an outer appearance of the display apparatus 1.

For example, the display case 11A may support the display panel 20. For example, the display case 11A may support the backlight unit 100. For example, the display case 11A may support the control assembly 50. For example, the display case 11A may support the power supply assembly 60.

For example, the display apparatus 1 may include a top chassis 13. The top chassis 13 may support the front surface and sides of the display panel 20. For example, the top chassis 13 may be provided in a shape of a substantially quadrangular frame.

The top chassis 13 may support the front surface of the display panel 20 by forming a bezel positioned toward the front direction of the display apparatus 1. However, according to the display apparatus 1 having a very narrow bezel or being a bezel-less type, the top chassis 13 may support only the sides of the display panel 20. Alternatively, according to a bottom chassis 15 supporting the sides of the display panel 20, the display apparatus 1 may not include the top chassis 13.

For example, the display apparatus 1 may include the bottom chassis 15. The bottom chassis 15 may cover a rear side of the display panel 20. The bottom chassis 15 may be coupled to a rear side of the top chassis 13. The bottom chassis 15 may support various components of the display apparatus 1, such as the backlight unit 100, the control assembly 50, the power supply assembly 60, etc.

The bottom chassis 15 may be formed in a shape of a substantially flat plate, although not limited thereto. The bottom chassis 15 may include a material having high thermal conductivity to dissipate heat generated in a light source 111 to the outside. For example, the bottom chassis 15 may include a metal material, such as aluminum or stainless steel (SUS), or a plastic material such as acrylonitrile butadiene styrene (ABS).

For example, the display apparatus 1 may include a middle mold 14. The middle mold 14 may be positioned between the top chassis 13 and the bottom chassis 15. For example, the middle mold 14 may support at least some components of the backlight unit 100.

For example, the display apparatus 1 may include a rear cover 16. The rear cover 16 may be positioned behind the bottom chassis 15, and cover the bottom chassis 15 and various components (for example, the control assembly 50, the power supply assembly 60, etc.) installed behind the bottom chassis 15.

Unlike FIG. 2, the display case 11A of the display apparatus 1 according to one or more embodiments may not include some components of a top chassis, a middle mold, a bottom chassis, and a rear cover.

The components of the display apparatus 1 described above with reference to FIG. 2 are only an example for describing the display apparatus 1 according to one or more embodiments, but the disclosure is not limited thereto. The display apparatus 1 according to the disclosure may include various components for performing a function of providing images through a screen.

Figure 3:
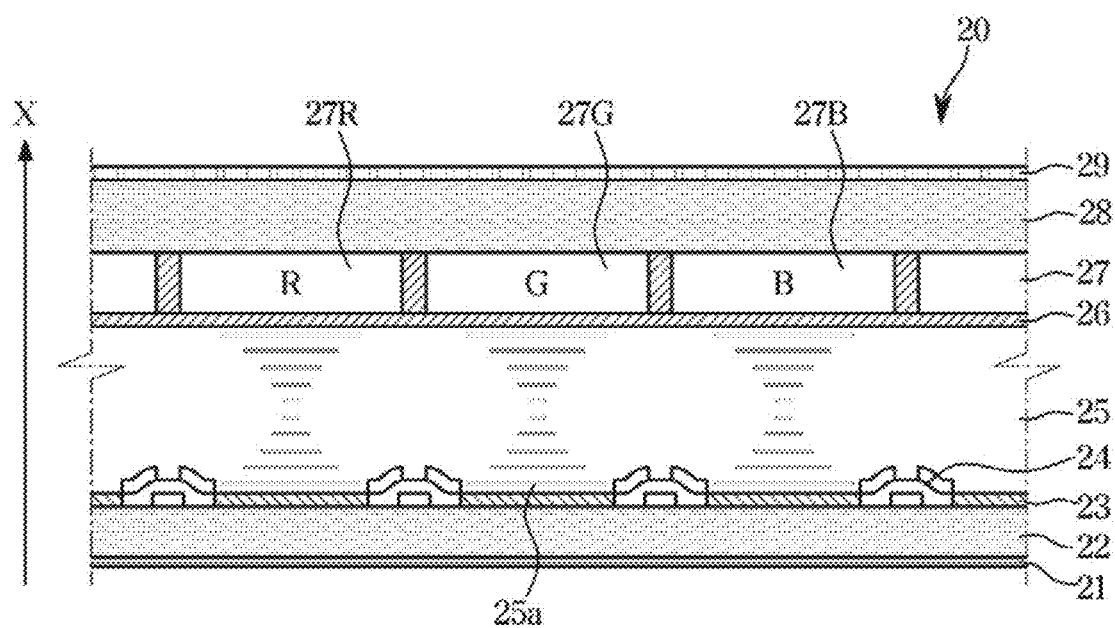
FIG. 3 is a cross-sectional view showing a liquid crystal panel of a display apparatus according to one or more embodiments of the disclosure.

FIG. 3 is a cross-sectional view showing a liquid crystal panel of a display apparatus according to one or more embodiments of the disclosure.

Referring to FIG. 3, the display panel 20 included in the display apparatus 1 according to one or more embodiments of the disclosure may be configured as a LCD panel to block or transmit light emitted from the backlight unit 100. By an operation of blocking or transmitting light emitted from the backlight unit 100, performed by the display panel 20, an image I may be formed on the front surface of the display panel 20.

The front surface of the display panel 20 may form the screen 12 of the display apparatus 1 as described above. In the display panel 20, the plurality of pixels P may be provided. The plurality of pixels P provided in the display panel 20 may block or transmit light emitted from the backlight unit 100 independently, and light transmitted by the plurality of pixels P may form an image I that is displayed on the screen 12.

For example, as shown in FIG. 3, the display panel 20 may include a first polarizing film 21, a first transparent substrate 22, a pixel electrode 23, a thin film transistor (TFT) 24, a liquid crystal layer 25, a common electrode 26, a color filter 27, a second transparent substrate 28, and a second polarizing film 29.

The first transparent substrate 22 and the second transparent substrate 28 may fix and support the pixel electrode 23, the thin film transistor 24, the liquid crystal layer 25, the common electrode 26, and the color filter 27. The first and second transparent substrates 22 and 28 may be made of tempered glass or a transparent resin.

On outer surfaces of the first and second transparent substrates 22 and 28, the first polarizing film 21 and the second polarizing film 29 may be respectively positioned.

The first polarizing film 21 and the second polarizing film 29 may transmit specific light and block the other light. For example, the first polarizing film 21 may transmit light having a magnetic field vibrating in a first direction and block the other light. Also, the second polarizing film 29 may transmit light having a magnetic field vibrating in a second direction and block the other light, wherein the second direction may be orthogonal to the first direction. Accordingly, a polarizing direction of light transmitted by the first polarizing film 21 may be orthogonal to a vibration direction of light transmitted by the second polarizing film 29. As a result, light may not be transmitted through the first polarizing film 21 and the second polarizing film 29 simultaneously.

The color filer 27 may be positioned on an inner surface of the second transparent substrate 28.

The color filter 27 may include a red filter 27R transmitting red light, a green filter 27G transmitting green light, and a blue filter 27B transmitting blue light, wherein the red filter 27R, the green filter 27G, and the blue filter 27B may be positioned side by side. An area in which the color filter 27 is formed may correspond to the pixel P described above. An area in which the red filter 27R is formed may correspond to the red sub pixel PR, an area in which the green filter 27G is formed may correspond to the green sub pixel PG, and an area in which the blue filter 27B is formed may correspond to the blue sub pixel PB.

On an inner surface of the first transparent substrate 22, the pixel electrode 23 may be positioned, and on an inner surface of the second transparent substrate 28, the common electrode 26 may be positioned.

The pixel electrode 23 and the common electrode 26 may be made of a metal material carrying electricity, and generate an electric field for changing alignment of liquid crystal molecules 25a configuring the liquid crystal layer 25 which will be described below.

The pixel electrode 23 and the common electrode 26 may be made of a transparent material, and transmit light received from outside. For example, the pixel electrode 23 and the common electrode 26 may be made of Indium Tin Oxide (ITO), Indium Zinc Oxide (IZO), an Ag nano wire, a carbon nano tube (CNT), graphene, or 3,4-ethylenedioxy-thiophene (PEDOT). On the inner surface of the first transparent substrate 22, the thin film transistor 24 may be positioned.

The thin film transistor 24 may transmit or block current flowing through the pixel electrode 23. For example, according to turning-on (closing) or turning-off (opening) of the thin film transistor 24, an electric field may be formed or removed between the pixel electrode 23 and the common electrode 26.

The thin film transistor 24 may be made of poly-silicon, and formed by a semiconductor process, such as lithography, deposition, ion implantation, etc.

The liquid crystal layer 25 may be formed between the pixel electrode 23 and the common electrode 26, and the liquid crystal layer 25 may be filled with the liquid crystal molecules 25a.

Liquid crystal means an intermediate state between a solid (crystal) state and a liquid state. Most of liquid crystal materials are organic compounds. A molecule of a liquid crystal material is in the shape of a thin, long rod. Also, the molecular arrangement of the liquid crystal material is irregular when seen in a specific direction, but appears as a regular crystalloid pattern when seen in another direction. Accordingly, the liquid crystal has both the fluidity of a liquid and the optical anisotropy of a crystal (solid).

Also, liquid crystal may show an optical property according to a change in electric field. For example, the direction of the molecular arrangement of liquid crystal may change according to a change in electric field. In the case in which an electric field is formed in the liquid crystal layer 25, liquid crystal molecules 25a of the liquid crystal layer 25 may be arranged according to the direction of the electric field, and in the case in which no electric field is formed in the liquid crystal layer 25, the liquid crystal molecules 25a may be arranged irregularly or according to an alignment layer. As a result, the optical property of the liquid crystal layer 25 may change according to the presence/absence of an electric field passing through the liquid crystal layer 25.

A structure of the display panel 20 described above with reference to FIG. 3 is only an exemplary structure of the display panel 20 of the display apparatus 1 according to one or more embodiments, but the disclosure is not limited thereto.

Figure 4:
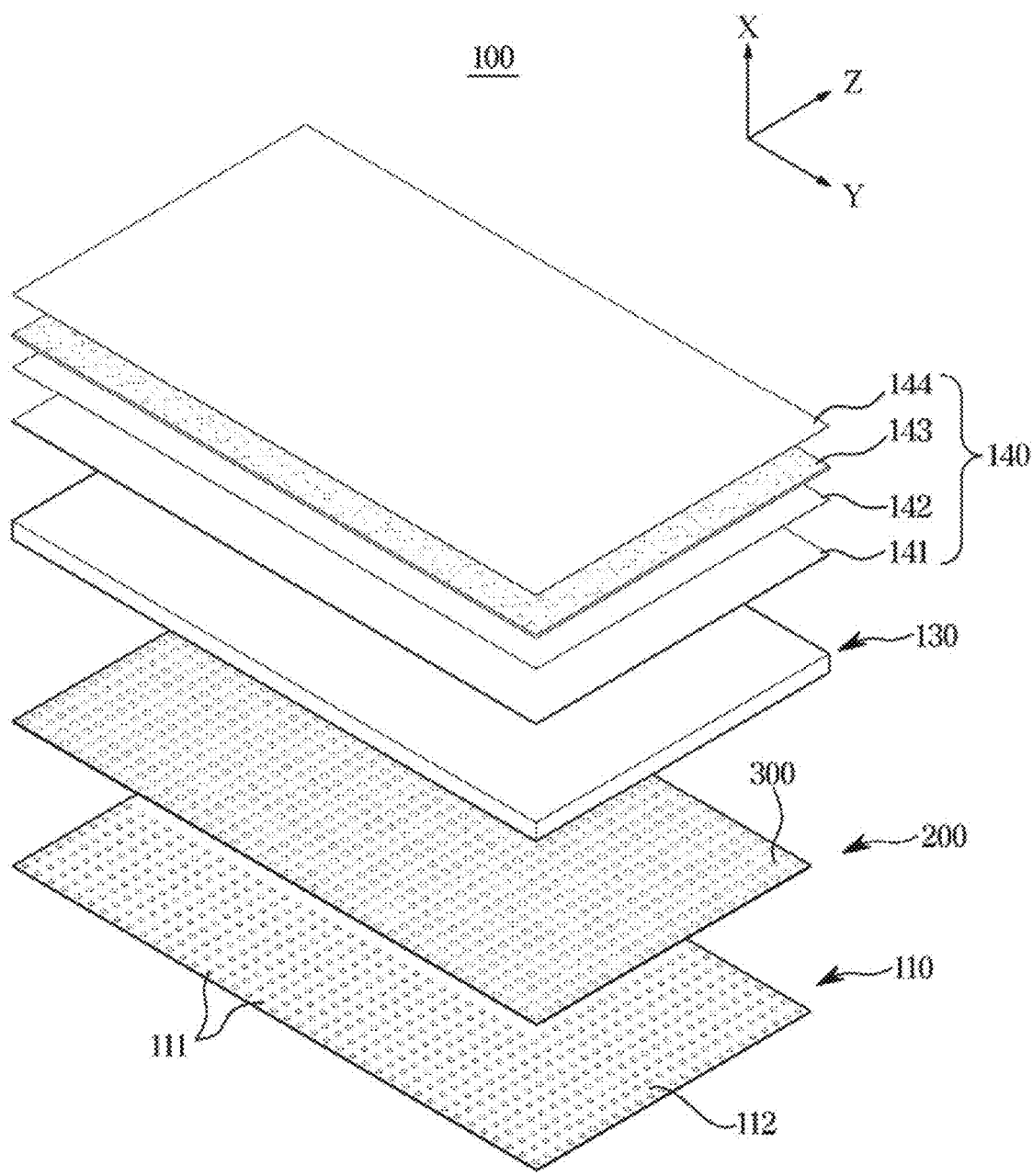
FIG. 4 is an exploded view showing a backlight unit of a display apparatus according to one or more embodiments of the disclosure.
Figure 5:
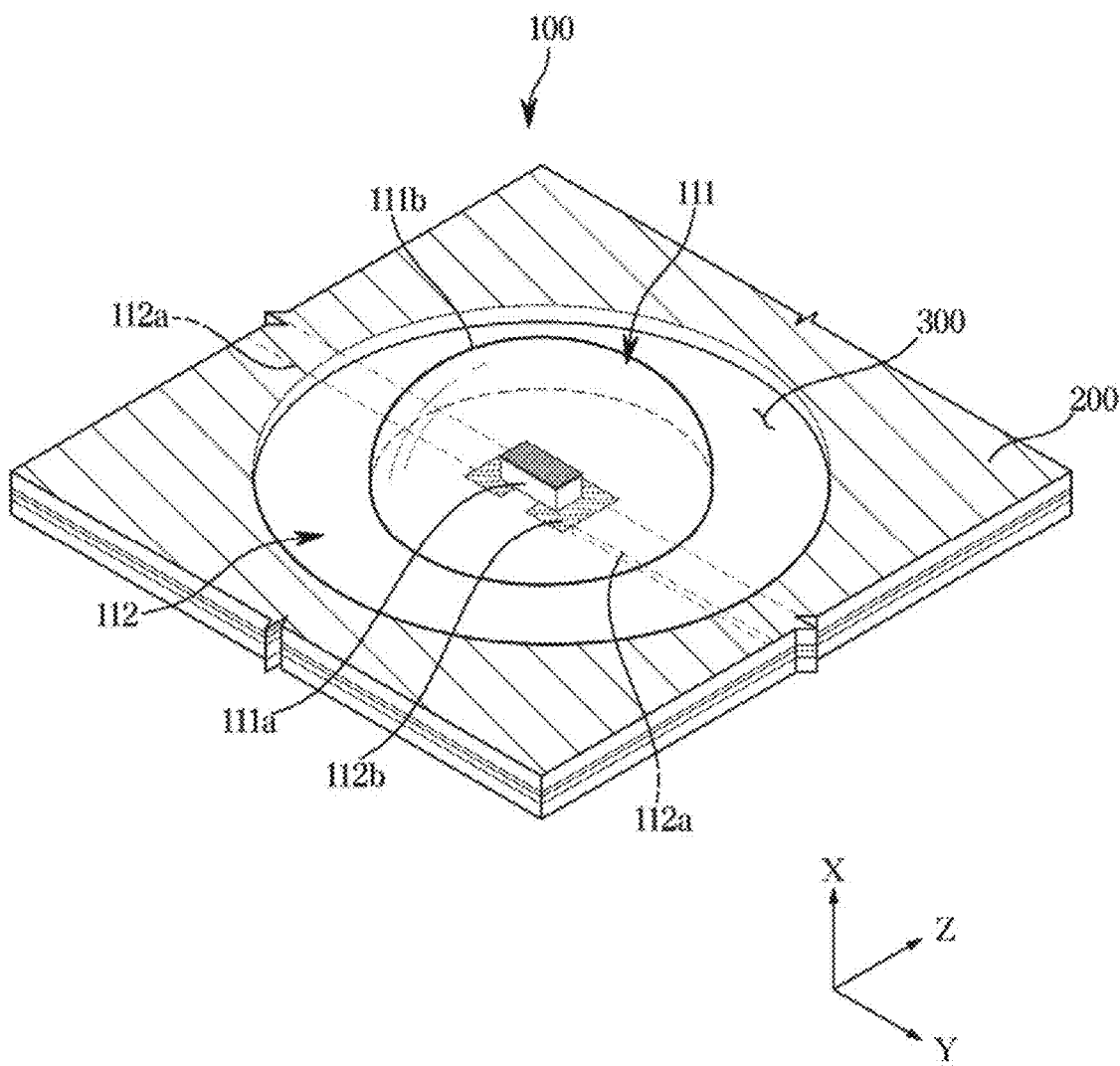
FIG. 5 is an enlarged view showing a light source and a reflective sheet of a display apparatus according to one or more embodiments of the disclosure.

FIG. 4 is an exploded view showing a backlight unit of a display apparatus according to one or more embodiments of the disclosure. FIG. 5 is an enlarged view showing a light source and a reflective sheet of a display apparatus according to one or more embodiments of the disclosure.

Referring to FIGS. 4 and 5, the backlight unit 100 may include a light source module 110. The light source module 110 may generate light and emit the light. More specifically, the light source module 110 may emit monochromatic light or white light.

The light source module 110 may include a plurality of light sources 111 for irradiating light, and a light source substrate 112 on which the plurality of light sources 111 are mounted. The light source substrate 112 may support and fix the plurality of light sources 111.

More specifically, the light sources 111 may irradiate light toward the display panel 20. Each light source 111 may adopt a device capable of emitting, upon receiving power, monochromatic light (light having a certain wave length, for example, blue light) or white light (for example, mixed light of red light, green light, and blue light) in various directions. For example, the light source 111 may include a Light Emitting Diode (LED).

The light source substrate 112 may fix the plurality of light sources 111 such that the light sources 111 do not change in position. Also, the light source substrate 112 may supply power to the light sources 111 to enable the light sources 111 to emit light.

The light source substrate 112 may be configured as a synthetic resin board, a tempered glass board, or a printed circuit board (PCB) on which the plurality of light sources 111 are fixed and a conductive power supply line for supplying power to the light sources 111 is formed.

The light source substrate 112 may be accommodated inside the display case 11A. The light source substrate 112 may be supported by the display case 11A. Because the light sources 111 mounted on the light source substrate 112 are supported by the light source substrate 112, the light sources 111 may be supported on the display case 11A.

The light sources 111 may be provided on a front surface of the light source substrate 112. The front surface of the light source substrate 112 may be one surface of the light source substrate 112 toward the display panel 20. That is, the light source 111 may be mounted on the light source substrate 112 toward the front direction to irradiate light in the front direction.

The plurality of light sources 111 may be arranged in a preset pattern to emit light with uniform brightness. The plurality of light sources 111 may be arranged such that distances between a light source and its neighboring light sources are the same.

For example, as shown in FIG. 4, the plurality of light sources 111 may be arranged in rows and columns positioned at regular intervals. Accordingly, the plurality of light sources 111 may be arranged such that four adjacent light sources have a substantially square shape. Also, a light source 111 may be adjacent to four light sources 111, and the distances between the light source 111 and the four adjacent light sources 111 may be substantially the same. Herein, "distance between light sources" may mean a straight distance between centers of adjacent light sources 111.

The plurality of light sources 111 may be arranged such that three adjacent light sources form substantially an equilateral triangle. In this case, a light source 111 may be adjacent to six light sources 111, and distances between the light source 111 and the six light sources 111 may be substantially the same.

However, an arrangement of the plurality of light sources 111 is not limited to the above-described arrangement, and the plurality of light sources 111 may be arranged in various ways as long as light is emitted with uniform brightness.

According to one or more embodiments, unlike FIG. 4, the light source substrate 112 may extend in one direction to have a bar shape. A plurality of LEDs 111a may be arranged at intervals in the extension direction of the light source substrate 112 to form an array.

A plurality of light source substrates 112 each having a bar shape may be arranged in such a way as to be spaced from each other in a direction that is perpendicular to the extension direction of the light source substrates 112.

Hereinafter, an exemplary structure of the light sources 111 and the light source substrate 112 will be described in detail with reference to FIGS. 4 and 5.

Each light source 111 may include a LED 111a. The LED 111a may include a P type semiconductor and a N type semiconductor for emitting light by recombination of holes with electrons. Also, in the LED 111a, a pair of electrodes may be provided to respectively supply holes and electrons to the P type semiconductor and the N type semiconductor.

The LED 111a may convert electrical energy into light energy. The LED 111a may emit light having a maximum strength in a preset wavelength based on supplied power. For example, the LED 111a may emit blue light having a peak value in a wavelength (for example, a wavelength ranging from 430 nm to 495 nm) that displays a blue color.

For example, a multilayer reflective structure in which a plurality of insulating films having different refractive indices are alternately stacked may be provided on the front surface of the LED 111a. For example, the multilayer reflective structure may be configured as a Distributed Bragg Reflector (DBR).

For example, the LED 111a may be attached directly on the light source substrate 112 by a Chip On Board (COB) method. In other words, the light source 111 may include the LED 111a in which a light emitting diode chip or a light emitting diode die is attached directly on the light source substrate 112 without any packaging.

To miniaturize the light source 111, the light source module 110 in which the LED 111a of a flip chip type is attached on the light source substrate 112 by the COB method may be manufactured.

The light source substrate 112 may include a power supply line 112a that supplies power to the light source 111. The power supply line 112a may supply an electrical signal and/or power from the control assembly 50 and/or the power supply assembly 60 to the light source 111. For example, the power supply line 112a may supply power to the LED 111a of the flip chip type.

For example, the light source substrate 112 may be formed by alternately stacking an insulation layer having non-conductivity and a conduction layer having conductivity.

On the conduction layer of the light source substrate 112, lines or patterns through which power and/or an electrical signal is transmitted may be formed. The conduction layer may be formed of various materials having electrical conductivity. For example, the conduction layer may be formed of various metal materials, such as copper (Cu), tin (Sn), aluminum (Al), or an alloy thereof. The power supply line 112a may be implemented by the lines or patterns formed on the conductive layer of the light source substrate 112.

A dielectric material of the insulation layer of the light source substrate 112 may insulate between the lines or patterns of the conduction layer. The insulation layer may be formed of a dielectric material for electrical insulation, for example, FR-4.

For example, on an outermost surface of the light source substrate 112, a protection layer for preventing the light source substrate 112 from being damaged by an external impact, a chemical action (for example, corrosion, etc.), and/or an optical action may be formed. For example, the protection layer of the light source substrate 112 may include a Photo Solder Resist (PSR).

The power supply line 112a may be covered by the protection layer of the light source substrate 112 to be prevented from being exposed to the outside.

For example, the light source substrate 112 may include a power supply pad 112b electrically connected to the power supply line 112a to supply power to the LED 111a of the flip chip type. The power supply line 112a may be electrically connected to the LED 111a through the power supply pad 112b.

For example, a window for exposing a portion of the power supply line 112a to the outside may be formed in the protection layer of the light source substrate 112. The power supply pad 112b may be electrically connected to the portion of the power supply line 112a, exposed to the outside of the light source substrate 112.

For example, various conductive adhesive materials, such as solder, Electrically Conductive Epoxy Adhesives, etc., having electrical conductivity may be applied between an electrode of the LED 111a and the power supply pad 112b.

The light source 111 may include an optical dome 111b. The optical dome 111b may cover the LED 111a. The optical dome 111b may prevent or suppress the LED 111a from being damaged by an external mechanical action and/or a chemical action.

The optical dome 111b may be in a shape of a dome resulting from cutting, for example, a sphere with a plane not including a center of the sphere, or in a shape of a hemisphere resulting from cutting a sphere with a plane including a center of the sphere. A vertical section of the optical dome 111b may be in a shape of, for example, a segment of a circle or a semicircle.

The optical dome 111b may be formed of silicon or an epoxy resin. For example, the optical dome 111b may be formed by discharging molten silicon or a molten epoxy resin onto the LED 111a through a nozzle, etc. and then hardening the discharged silicon or epoxy resin.

The optical dome 111b may be optically transparent or translucent. Light emitted from the LED 111a may pass through the optical dome 111b and be emitted to the outside.

At this time, the optical dome 111b being in a shape of a dome may refract the light, like a lens. For example, light emitted from the LED 111a may be refracted by the optical dome 111b and dispersed.

The structure of the light source module 110, such as the light source 111, the light source substrate 112, etc., described above with reference to FIGS. 4 and 5 are only an exemplary structure of the light source module 110 of the display apparatus 1 according to one or more embodiments of the disclosure, but the disclosure is not limited thereto.

As shown in FIG. 4, the backlight unit 100 may include a diffuser plate 130 for uniformly diffusing light. The diffuser plate 130 may be positioned in front of the light source module 110 and a reflective sheet 200. The diffuser plate 130 may uniformly disperse light emitted from the light source module 110 and then emit the light in the front direction.

As shown in FIG. 4, the backlight unit 100 may include an optical sheet 140 for further improving brightness and brightness uniformity of emitted light. The optical sheet 140 may refract and scatter light emitted from a front surface of the diffuser plate 130. The optical sheet 140 may include various kinds of sheets to improve brightness or brightness uniformity. For example, the optical sheet 140 may include a light conversion sheet 141, a diffuser sheet 142, a prism sheet 143, and a reflective polarizing sheet 144. The kinds of the optical sheet 140 are not limited to the sheets or films shown in FIG. 4, and may include various sheets or films such as a protective sheet.

According to one or more embodiments of the disclosure, the display apparatus 1 may include the reflective sheet 200.

The reflective sheet 200 may reflect light. More specifically, the reflective sheet 200 may reflect light toward the display panel 20. The reflective sheet 200 may be a component included in the backlight unit 100 and reflect light emitted from the plurality of light sources 111 or light reflected by various components inside the main body 11 toward the display panel 20. The reflective sheet 200 may reflect light in the front direction or in a direction close to the front direction.

For example, the plurality of light sources 111 may emit light in all directions in front of the reflective sheet 200. Light emitted from the light sources 111 may be emitted toward the diffuser plate 130 and emitted toward the reflective sheet 200 from the light source module 110. The reflective sheet 200 may reflect light emitted toward the reflective sheet 200 toward the diffuser plate 130.

Alternatively, while light emitted from the light source module 110 passes through various objects, such as the diffuser plate 130, the optical sheet 140, etc., a part of the light may be reflected from surfaces of the diffuser plate 130, the optical sheet 140, etc. The reflective sheet 200 may again reflect the reflected light in the front direction.

The reflective sheet 200 may be positioned in front of the light source substrate 112. More specifically, the reflective sheet 200 may be coupled with the front surface of the light source substrate 112. The reflective sheet 200 may be attached to the front surface of the light source substrate 112.

For example, the reflective sheet 200 may have a substantially rectangular shape. More specifically, a length of horizontal sides of the reflective sheet 200 may be different from a length of vertical sides of the reflective sheet 200. That is, the reflective sheet 200 may have long sides and short sides, although not limited thereto. The reflective sheet 200 may be in a shape of a square of which the long and short sides have the substantially same length. The shape of the reflective sheet 200 may substantially correspond to the shape of the display panel 20. A length ratio of the horizontal and vertical sides of the reflective sheet 200 may approximately correspond to a length ratio of the horizontal and vertical sides of the display panel 20.

The reflective sheet 200 may include a plurality of holes 300 corresponding to the respective positions of the plurality of light sources 111. The plurality of light sources 111 may respectively penetrate the plurality of holes 300. The plurality of holes 300 may be formed by penetrating the reflective sheet 200 in a front-rear direction X.

The plurality of holes 300 may be formed at positions respectively corresponding to the plurality of light sources 111 in the reflective sheet 200. The plurality of light sources 111 may respectively protrude in the front direction from the reflective sheet 200 by passing through the holes 300 of the reflective sheet 200. Accordingly, the light sources 111 and some parts of the light source substrate 112 may be exposed toward the front direction of the reflective sheet 200 through the holes 300. By this configuration, the light sources 111 may emit light in the front direction of the reflective sheet 200.

Each light source 111 may be positioned inside each hole 300. The light source 111 may be surrounded by an inner circumferential surface of the hole 300.

For example, the light source 111 penetrating the hole 300 may be positioned in a center of the hole 300. In other words, a center of the light source 111 may be positioned at a center of the hole 300.

For example, each of the plurality of holes 300 may have a substantially circular shape, although not limited thereto. However, the hole 300 may be formed in various shapes.

As shown in FIG. 5, each of the plurality of holes 300 formed in the reflective sheet 200 may have a larger size than each of the plurality of light sources 111. More specifically, a diameter of each of the plurality of holes 300 may be larger than a diameter of each of the plurality of light sources 111. Accordingly, while the reflective sheet 200 is coupled with the front surface of the light source substrate 112, each light source 111 may easily penetrate the corresponding hole 300 without being interfered by the reflective sheet 200.

Because the size of the hole 300 is larger than the size of the light source 111, the light source 111 and a part of the light source substrate 112 around the light source 111 may be exposed in the front direction through the hole 300.

The reflective sheet 200 may have higher light reflectance than the light source substrate 112. For example, the reflective sheet 200 may be made of a material having higher light reflectance than a material of the light source substrate 112. Accordingly, in an area of the reflective sheet 200 where the hole 300 is formed, the light source 111 and a part of the light source substrate 112 are placed instead of the reflective sheet 200. Consequently, the light reflectance of the area may be reduced. The reduction in light reflectance in the area of the reflective sheet 200 where the hole 300 may be proportional to the size (i.e., an area) of the hole 300. When the hole 300 in the reflective sheet 200 has a circular shape, the reduction in light reflectance may become greater as a diameter of the hole 300 increases.

Figure 6:
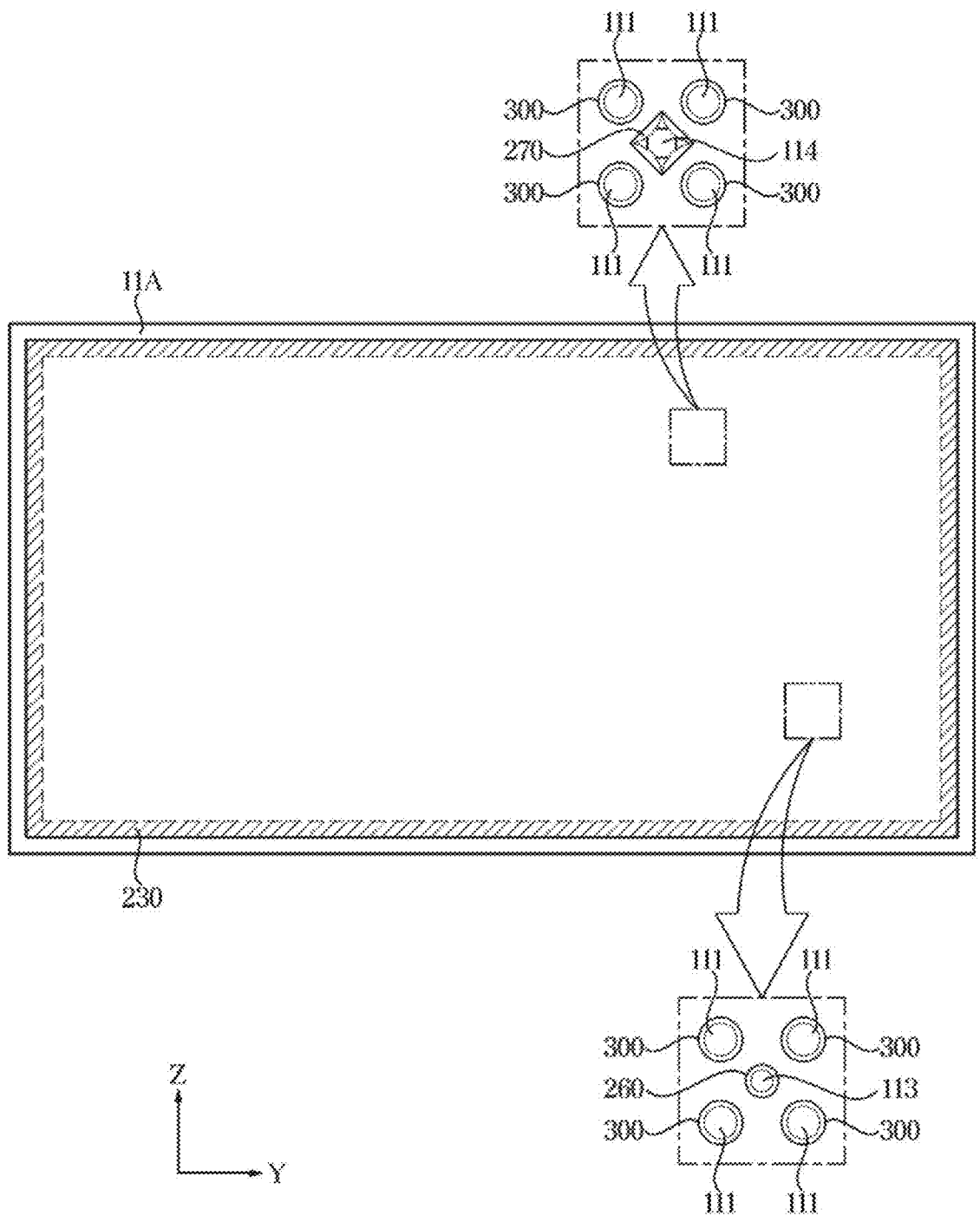
FIG. 6 shows a part of a display case and a reflective sheet of a display apparatus according to one or more embodiments of the disclosure.
Figure 7:
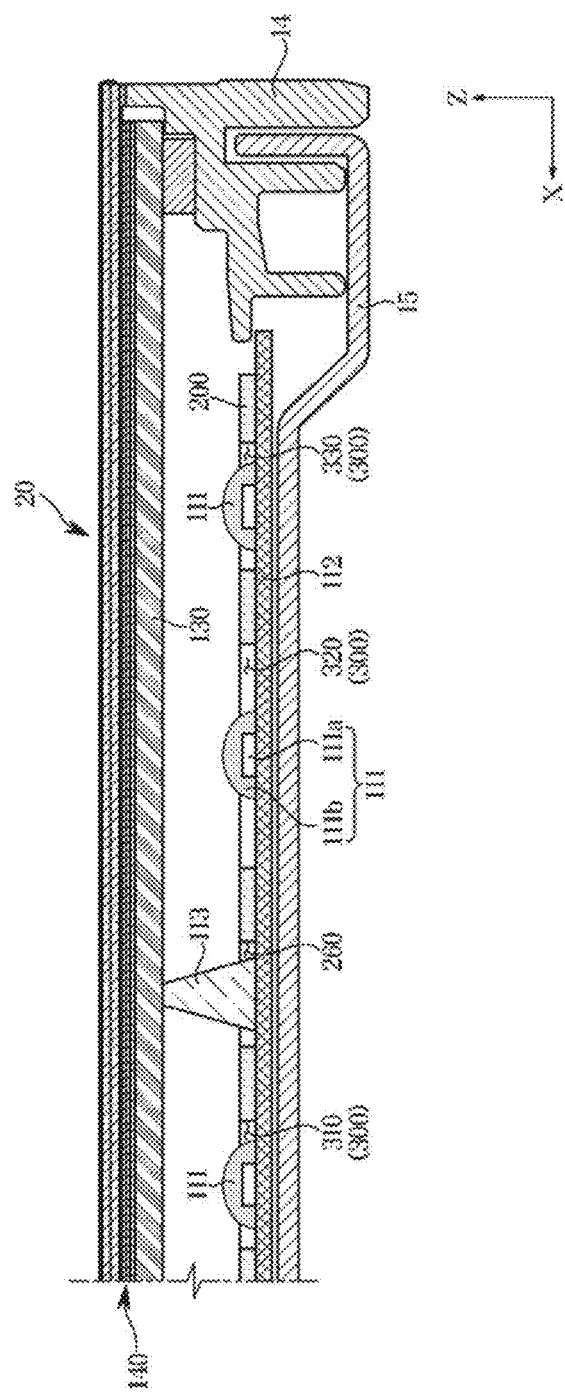
FIG. 7 is a side cross-sectional view showing a portion of a display apparatus according to one or more embodiments of the disclosure.

FIG. 6 shows a part of a display case and a reflective sheet of a display apparatus according to one or more embodiments of the disclosure. FIG. 7 is a side cross-sectional view showing a portion of a display apparatus according to one or more embodiments of the disclosure.

Referring to FIGS. 6 and 7, the reflective sheet 200 of the display apparatus 1 may be perforated with the plurality of holes 300 which accommodate the plurality of light sources 111 according to one or more embodiments of the disclosure.

For example, the plurality of holes 300 may be arranged at regular intervals. For example, the plurality of holes 300 may be arranged uniformly over an entire area of the reflective sheet 200. As shown in FIG. 7, some holes 310, 320, and 330 of the plurality of holes 300 may have different diameters. In this case, the plurality of holes 310, 320, and 330 may also be arranged such that distances between the centers of the holes 310, 320, and 330 are the same.

For example, the plurality of holes 300 may be arranged with a preset pattern to correspond to a pattern in which the plurality of light sources 111 are arranged in the reflective sheet 200. The plurality of holes 300 may be arranged such that distances between adjacent ones of the plurality of holes 300 are the same.

For example, as shown in FIG. 4, the plurality of holes 300 may be arranged in rows and columns. Accordingly, the plurality of holes 300 may be arranged such that four adjacent holes 300 form a substantially square shape. Also, any one hole 300 may be positioned adjacent to four holes 300 and distances between the one hole 300 and the adjacent four holes 300 may be the substantially same. Herein, "distances between holes" may be straight line distances between the centers of the adjacent holes 300.

The plurality of holes 300 may be arranged to form a substantially equilateral triangle by three adjacent holes. In this case, one light source may be positioned adjacent to six light sources. Also, distances between the one light source and the six adjacent light sources may be the substantially same, although not limited thereto.

However, the plurality of holes 300 may be arranged variously.

For example, the display apparatus 1 may include a supporter 113. The supporter 113 may be positioned between the light source substrate 112 and the diffuser plate 130. The supporter 113 may support components, such as the diffuser plate 130, the optical sheet 140, etc., positioned in front of the reflective sheet 200.

The supporter 113 may be provided on the light source substrate 112. The supporter 113 may be mounted on the front surface of the light source substrate 112. The supporter 113 may protrude toward the diffuser plate 130 from the light source substrate 112. The supporter 113 may extend between the light source substrate 112 and the diffuser plate 130.

The supporter 113 may maintain an optical distance (OD) between the light sources 111 and the diffuser plate 130 and/or the optical sheet 140 to maintain optical characteristics of the backlight unit 100. The supporter 113 may have a length capable of maintaining the optical characteristics of the backlight unit 100.

The reflective sheet 200 may include a supporter hole 260 which the supporter 113 penetrates. The supporter hole 260 may be formed by penetrating the reflective sheet 200 in the front-rear direction X.

The supporter hole 260 may be formed at a position corresponding to the position of the supporter 113 in the reflective sheet 200. The supporter 113 may penetrate the supporter hole 260 from the light source substrate 112 and extend to the diffuser plate 130. The supporter 113 may be positioned at the supporter hole 260.

A part of the supporter 113 may be positioned inside the supporter hole 260. The part of the supporter 113 may be surrounded by an inner circumferential surface of the supporter hole 260. A part of the supporter 113 positioned inside the supporter hole 260 may include a part of the supporter 113 being adjacent to the light source substrate 112.

For example, the supporter hole 260 may have a smaller size than each of the plurality of holes 300. As such, because the size of the supporter hole 260 is smaller than the size of each hole 300, a degree to which light reflectance of the reflective sheet 200 is reduced by the supporter hole 260 may be reduced. For example, the supporter hole 260 may have a diameter of about 3 mm, although not limited thereto. However, the supporter hole 260 may have various sizes, and may have a larger size than each of the plurality of holes 300.

A plurality of supporters 113 may be provided. A plurality of supporter holes 260 may be provided correspondingly.

The number of the plurality of supporters 113 may be less than the number of the plurality of light sources 111 included in the light source module 110. The number of the plurality of supporter holes 260 may be correspondingly less than the number of the plurality of holes 300 formed in the reflective sheet 200.

For example, as shown in FIG. 6, the supporters 113 may be positioned between the plurality of light sources 111. The supporter holes 260 may be positioned between the plurality of holes 300 in the reflective sheet 200.

The display apparatus 1 may include a driving device 114 mounted on the light source substrate 112. The driving device 114 may control at least some light sources 111 among the plurality of light sources 111 mounted on the same light source substrate 112.

The driving device 114 may be mounted on the light source substrate 112 and electrically connected to the power supply line 112a. The driving device 114 may be electrically connected to the control assembly 50 and/or the power supply assembly 60 through the power supply line 112a.

For example, the plurality of light sources 111 may be divided into a plurality of dimming blocks including at least one light source 111, and the driving device 114 may output a dimming signal to control each of the dimming blocks.

For example, the driving device 114 may be implemented as a pixel Integrated Circuit (IC), an Active Matrix Integrated Circuit (AM IC), etc.

For example, the driving device 114 may be mounted on the front surface of the light source substrate 112. The front surface of the light source substrate 112 may be one surface of the light source substrate 112 toward the display panel 20.

As shown in FIG. 6, the reflective sheet 200 may include a driving device penetrating portion 270 formed in an area corresponding to a position of each of the plurality of driving devices 114. Each of the plurality of driving devices 114 may protrude in the front direction of the reflective sheet 200 by penetrating the driving device penetrating portion 270 corresponding to the driving device 114.

For example, the driving device penetrating portion 270 may be formed by cutting out a part of the reflective sheet 200, and while the reflective sheet 200 is attached to the light source substrate 112, the driving device penetrating portion 270 may be pressed by the driving device 114 to open.

A plurality of driving devices 114 may be provided. A plurality of driving device penetrating portions 270 may be provided correspondingly.

The number of the plurality of driving devices 114 may be less than the number of the plurality of light sources 111 included in the light source module 110. The number of the plurality of driving device penetrating portions 270 may be correspondingly less than the number of the plurality of holes 300 formed in the reflective sheet 200.

For example, as shown in FIG. 6, each driving device 114 may be positioned between the plurality of light sources 111. Each driving device penetrating portion 270 may be correspondingly positioned between the plurality of holes 300 in the reflective sheet 200.

The reflective sheet 200 may be provided inside the main body 11 of the display apparatus 1. The reflective sheet 200 may be positioned inside the display case 11A.

In this case, edges of the reflective sheet 200 may be adjacent to inner edges of the display case 11A. The inner edges of the display case 11A may include surfaces formed along edges of the display case 11A toward inside of the display case 11A among edge portions of the display case 11A. For example, the display case 11A may have a substantially rectangular shape, and in this case, the inner edges of the display case 11A may include inner surfaces of the display case 11A formed along substantially four sides of the display case 11A.

For example, the inner edges of the display case 11A may be formed by edge portions of the middle mold 14. For example, the inner edges of the display case 11A may be formed by edge portions of the bottom chassis 15. The inner edges of the display case 11A may be formed by edge portions of the top chassis 13, although not limited thereto. However, the inner edges of the display case 11A may be formed by various structures constituting the display case 11A.

Because the edge portions of the display case 11A are positioned along edges of the display panel 20 and the reflective sheet 200 have a shape and size substantially corresponding to the display panel 20, outer edges of the reflective sheet 200 may be positioned along the inner edges of the display case 11A and adjacent to the inner edges of the display case 11A.

In this case, light brightness in an edge area 230 of the reflective sheet 200, which is adjacent to the inner edges of the display case 11A, may be relatively lower than light brightness in a center area of the reflective sheet 200. More specifically, brightness of areas corresponding to the edge area 230 of the reflective sheet 200 on a screen 12 (see FIG. 1) displayed by the display panel 20 may be lower than brightness of an area corresponding to the center area of the reflective sheet 200. For example, because neither a light source nor a structure for reflecting light are provided in the inner edges of the display case 11A, brightness of the areas corresponding to the edge area 230 of the reflective sheet 200 may be low compared to brightness of the area corresponding to the center area of the reflective sheet 200.

As a result, the screen 12 may exhibit brightness non-uniformity. Brightness of an edge area of the screen 12 may relatively greatly deteriorate compared to brightness of a central area of the screen 12, which may cause a user to feel that the edge area of the screen 12 are darker.

To resolve this issue, one approach is to intentionally lower brightness of a center portion of the backlight unit 100, which may improve brightness uniformity between the central area and the edge area of the screen 12. However, this adjustment may reduce the overall brightness of the screen 12.

Alternatively, to resolve this issue, a phosphor pattern may be printed on a portion of the reflective sheet 200. For example, a phosphor pattern for converting a wavelength of light may be printed on the edge portions of the reflective sheet 200. However, in this case, a process of printing a phosphor pattern may increase product manufacturing cost.

To resolve this issue, in the display apparatus 1 according to one or more embodiments of the disclosure, the holes 310, 320, and 330 having different sizes may be provided according to areas of the reflective sheet 200, as shown in FIG. 7. Details about this will be described with reference to FIGS. 8 to 14.

Figure 8:
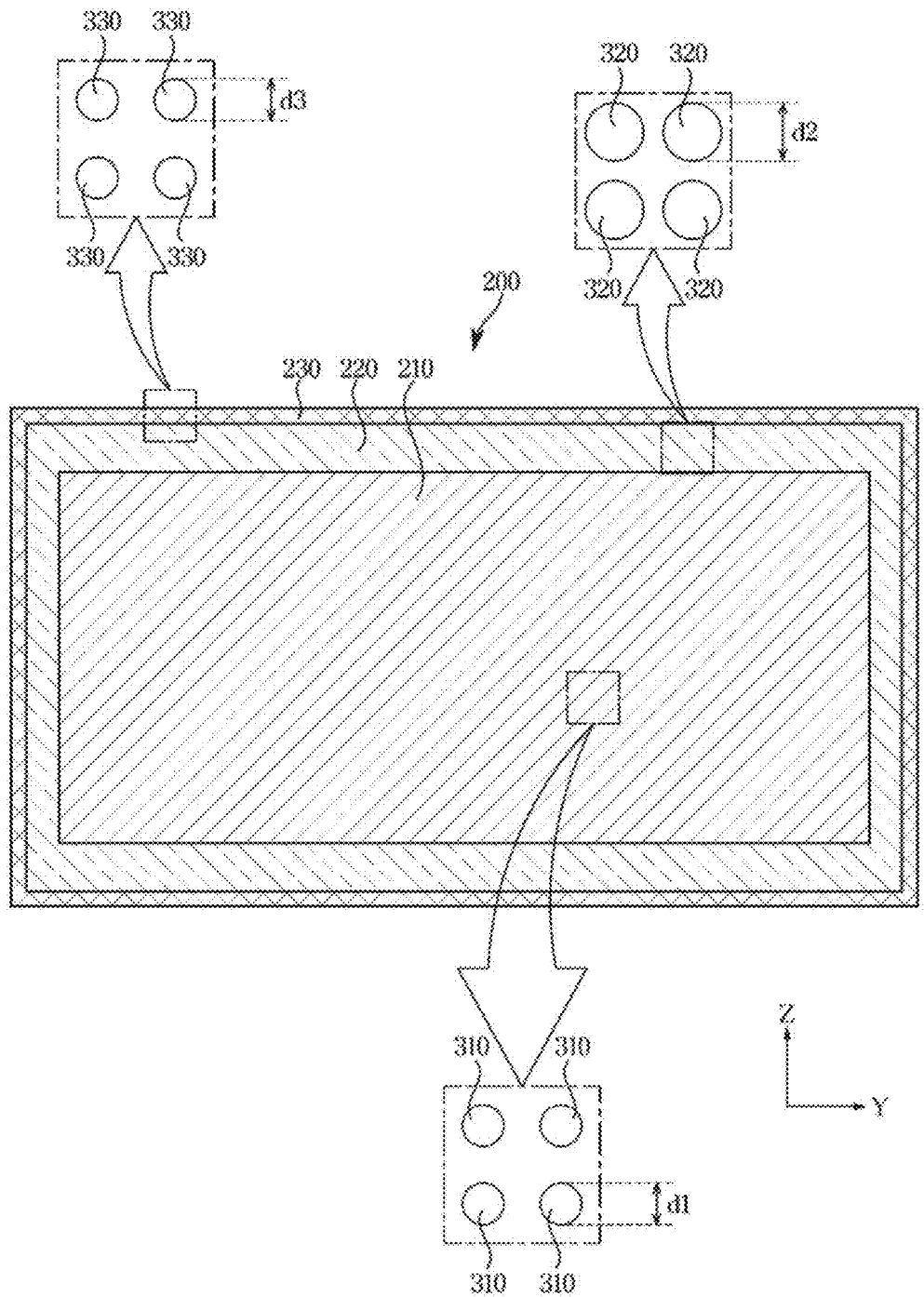
FIG. 8 shows a reflective sheet of a display apparatus according to one or more embodiments of the disclosure.

FIG. 8 shows a reflective sheet of a display apparatus according to one or more embodiments of the disclosure.

Referring to FIG. 8, the reflective sheet 200 of the display apparatus 1 according to one or more embodiments of the disclosure may include a central area 210, a middle area 220, and the edge area 230.

The central area 210 may include a center portion of the reflective sheet 200. The central area 210 may be provided in a center of the reflective sheet 200.

The central area 210 may include a center portion of the front surface of the reflective sheet 200. In other words, the central area 210 may include an area corresponding to the center portion among areas on one surface of the reflective sheet 200 toward the display panel 20.

The central area 210 may extend outward from the center of the reflective sheet 200 toward the edges of the reflective sheet 200. The central area 210 may extend vertically or horizontally from the center of the reflective sheet 200 toward the edges of the reflective sheet 200.

For example, the central area 210 may be formed symmetrically with respect to the center of the reflective sheet 200. More specifically, the central area 210 may be formed symmetrically with respect to a center line passing the center of the reflective sheet 200 in a vertical direction Z. Alternatively, the central area 210 may be formed symmetrically with respect to a center line passing the center of the reflective sheet 200 in a horizontal direction Y.

For example, the central area 210 may be defined as a substantially rectangular area. For example, the central area 210 may be defined as an area of which a length ratio of the horizontal and vertical sides approximately corresponds to a length ratio of the horizontal and vertical sides of the reflective sheet 200, although not limited thereto. However, the central area 210 may be defined as an area having various shapes.

For example, the central area 210 may include a major area of the reflective sheet 200.

The middle area 220 may be provided outward from the central area 210. The middle area 220 may be positioned closer to the edges of the reflective sheet 200 than the central area 210. The middle area 220 may be positioned between the central area 210 and the edge area 230 which will be described below.

The middle area 220 may include an area among the areas on the front surface of the reflective sheet 200. In other words, the middle area 220 may include an area located outward from the central area 210 among the areas on the surface of the reflective sheet 200 toward the display panel 20.

For example, the middle area 220 may be formed along a circumferential direction of the reflective sheet 200. The middle area 220 may be provided along edges of the central area 210. The middle area 220 may surround an outer circumference of the central area 210. In this case, the middle area 220 may be in a shape of a ring that substantially surrounds the circumference of the central area 210. More specifically, the middle area 220 may be in a shape of a rectangular ring that substantially surrounds the circumference of the central area 210.

For example, the middle area 220 may be formed symmetrically with respect to the center of the reflective sheet 200. More specifically, the middle area 220 may be formed symmetrically with respect to the center line passing the center of the reflective sheet 200 in the vertical direction Z. Alternatively, the middle area 220 may be formed symmetrically with respect to the center line passing the center of the reflective sheet 200 in the horizontal direction Y.

For example, because the central area 210 is defined as an area having a relatively large size in the reflective sheet 200, the middle area 220 may be positioned closer to the edges of the reflective sheet 200 than the center of the reflective sheet 200. Both outer edges of the middle area 220 and inner edges of the middle area 220 may be positioned closer to the edges of the reflective sheet 200 than the center of the reflective sheet 200.

The edge area 230 may be provided outward from the middle area 220. The edge area 230 may be positioned closer to the edges of the reflective sheet 200 than the middle area 220. The edge area 230 may be provided along the inner edges of the display case 11A. The edge area 230 may be positioned adjacent to the inner edges of the display case 11A.

The edge area 230 may include an area among the areas on the front surface of the reflective sheet 200. In other words, the edge area 230 may include an area located outward from the middle area 220 among the areas of the surface of the reflective sheet 200 toward the display panel 20.

For example, the edge area 230 may be provided along the edges of the reflective sheet 200. The edge area 230 may be formed along the circumferential direction of the reflective sheet 200. Also, for example, the edge area 230 may be provided along outermost edges of the reflective sheet 200.

For example, the edge area 230 may surround the middle area 220. For example, the edge area 230 may surround an outer circumference of the middle area 220. In this case, the edge area 230 may be in a shape of a ring that substantially surrounds the circumference of the middle area 220. More specifically, the edge area 230 may be in a shape of a rectangular ring that substantially surrounds the circumference of the middle area 220.

For example, the edge area 230 may be formed symmetrically with respect to the center of the reflective sheet 200. More specifically, the edge area 230 may be formed symmetrically with respect to the center line passing the center of the reflective sheet 200 in the vertical direction Z. Alternatively, the edge area 230 may be formed symmetrically with respect to the center line passing the center of the reflective sheet 200 in the horizontal direction Y.

The edge area 230 may extend by a preset length from the outermost edges of the reflective sheet 200. For example, the edge area 230 may be formed with a thickness of about 0.5 to about 1 cm from the outermost edges of the reflective sheet 200.

For example, the thickness of the edge area 230 may be smaller than thicknesses of the central area 210 and the middle area 220. That is, according to one or more embodiments, the central area 210 may have a greatest thickness, the middle area 220 may have a thickness that is smaller than the thickness of the central area 210, and the edge area 230 may have a thickness that is smaller than the thickness of the middle area 220. However, unlike this, the thickness of the edge area 230 may be substantially equal to or similar to the thickness of the middle area 220, or the thickness of the edge area 230 may be greater than the thickness of the middle area 220.

The central area 210, the middle area 220, and the edge area 230 described above may be respectively defined as some areas formed in the reflective sheet 200. The central area 210, the middle area 220, and the edge area 230 may be defined as areas conceptually divided from each other, and do not necessarily have to be physically separated from each other. For example, the central area 210, the middle area 220, and the edge area 230 may be connected to each other, and conceptually divided from each other according to the positions.

Referring to FIG. 8, the plurality of holes 300 included in the reflective sheet 200 may include holes 310, 320, and 330 having different sizes.

The reflective sheet 200 may include a central hole 310. The central hole 310 may be a kind of a hole 300 which the light source 111 penetrates. The central hole 310 may be positioned in the center portion of the reflective sheet 200. That is, the central hole 310 may be positioned in the central area 210. The central hole 310 may be formed in the central area 210.

As shown in FIG. 8, the central hole 310 may have a substantially circular shape. As shown in FIG. 8, the central hole 310 may be formed in a shape of a circle having a diameter of d1.

A plurality of central holes 310 may be provided. That is, the reflective sheet 200 may include the plurality of central holes 310.

For example, the plurality of central holes 310 may have the same size. In other words, the plurality of central holes 310 may have the same area. For example, each of the plurality of central holes 310 may have a diameter of d1. In this case, a degree to which light reflectance of the reflective sheet 200 is reduced by each of the plurality of central holes 310 may be substantially the same.

The plurality of central holes 310 may be positioned in at least one part of the central area 210. The plurality of central holes 310 may be positioned in the center portion of the reflective sheet 200.

For example, the plurality of central holes 310 having the same size may be arranged over an entire of the central area 210. Unlike this, for example, the plurality of central holes 310 may be arranged in a part of the central area 210, and in another part of the central area 210, a hole 300 having a different size from the size of the plurality of central holes 310 may be positioned.

For example, the central area 210 may include a major area of the reflective sheet 200, and the plurality of central holes 310 may be arranged over the major area of the reflective sheet 200. That is, most of the plurality of holes 300 formed in the reflective sheet 200 may be composed of the plurality of central holes 310 having the diameter of d1.

The reflective sheet 200 may include a middle hole 320. The middle hole 320 may be a kind of a hole 300 which the light source 111 penetrates. The middle hole 320 may be positioned outward from the central hole 310. In other words, a distance of the middle hole 320 from the center of the reflective sheet 200 may be greater than a distance of the central hole 310 from the center of the reflective sheet 200. Also, a distance of the middle hole 320 from the edges of the reflective sheet 200 may be smaller than a distance of the central hole 310 from the edges of the reflective sheet 200. That is, the middle hole 320 may be positioned in the middle area 220. The middle hole 320 may be formed in the middle area 220.

For example, the middle hole 320 may be positioned between the central hole 310 and an edge hole 330 which will be described below. However, although the middle hole 320 is positioned outward from the central hole 310 and the edge hole 330 is positioned outward from the middle hole 320, the middle hole 320 may not be necessarily positioned between the central hole 310 and the edge hole 330, and there may be a case in which a distance from the center of the reflective sheet 200 increases in the order of the central hole 310, the middle hole 320, and the edge hole 330.

As shown in FIG. 8, the middle hole 320 may have a substantially circular shape. As shown in FIG. 8, the middle hole 320 may be formed in a shape of a circle having a diameter of d2.

A plurality of middle holes 320 may be provided. That is, the reflective sheet 200 may include the plurality of middle holes 320.

For example, the plurality of middle holes 320 may have the same size. In other words, the plurality of middle holes 320 may have the same area. For example, each of the plurality of middle holes 320 may have the diameter of d2. In this case, a degree to which light reflectance of the reflective sheet 200 is reduced by each of the plurality of middle holes 320 may be substantially the same. Unlike this, some of the plurality of middle holes 320 may have different sizes (see FIG. 9).

The plurality of middle holes 320 may be positioned in at least one part of the middle area 220. The plurality of middle holes 320 may be arranged along the outer circumference of the area where the plurality of central holes 310 are arranged in the reflective sheet 200.

For example, the plurality of middle holes 320 may be arranged along the middle area 220. According to the middle area 220 being formed along the circumferential direction of the reflective sheet 200, the plurality of middle holes 320 may be arranged along the circumferential direction of the reflective sheet 200.

For example, the plurality of middle holes 320 having the same size may be arranged over an entire of the middle area 220. Unlike this, for example, the plurality of middle holes 320 may be arranged in a part of the middle area 220, and in another part of the middle area 220, a hole 300 having a different size from the size of the plurality of middle holes 320 may be positioned.

For example, each of the plurality of middle holes 320 may be positioned closer to the edges of the reflective sheet 200 than the center of the reflective sheet 200.

The reflective sheet 200 may include the edge hole 330. The edge hole 330 may be a kind of a hole 300 which the light source 111 penetrates. The edge hole 330 may be positioned outward from the middle hole 320. In other words, a distance of the edge hole 330 from the center of the reflective sheet 200 may be greater than the distance of the middle hole 320 from the center of the reflective sheet 200. Also, a distance of the edge hole 330 from the edges of the reflective sheet 200 may be smaller than the distance of the middle hole 320 from the edges of the reflective sheet 200. That is, the edge hole 330 may be positioned in the edge area 230. The edge hole 330 may be formed in the edge area 230.

As shown in FIG. 8, the edge hole 330 may be formed in a substantially circular shape. As shown in FIG. 8, the edge hole 330 may be formed in a circular shape having a diameter of d3.

A plurality of edge holes 330 may be provided. That is, the reflective sheet 200 may include the plurality of edge holes 330.

For example, the plurality of edge holes 330 may have the same size. In other words, the plurality of edge holes 330 may have the same area. For example, each of the plurality of edge holes 330 may have the diameter of d3. In this case, a degree to which light reflectance of the reflective sheet 200 is reduced by each of the plurality of edge holes 330 may be substantially the same. However, unlike this, some of the plurality of central holes 310 may have different sizes (see FIG. 11).

The plurality of edge holes 330 may be positioned in at least one part of the edge area 230. The plurality of edge holes 330 may be arranged along the outer circumference of the area where the plurality of middle holes 320 are arranged in the reflective sheet 200.

For example, the plurality of edge holes 330 may be arranged along the edge area 230. According to the edge area 230 being formed along the circumferential direction of the reflective sheet 200, the plurality of edge holes 330 may be arranged along the circumferential direction of the reflective sheet 200. According to the edge area 230 being provided along the outermost edge of the reflective sheet 200, the plurality of edge holes 330 may be arranged along the outermost edges of the reflective sheet 200.

For example, the plurality of edge holes 330 having the same size may be arranged over an entire of the edge area 230. Unlike this, for example, the plurality of edge holes 330 may be arranged in a part of the edge area 230, and in another part of the edge area 230, a hole 330 having a different size from the size of the plurality of edge holes 330 may be positioned.

For example, a distance of each of the plurality of edge holes 330 from the edges of the reflective sheet 200 may be smaller than that of the edge hole 330 from the center of the reflective sheet 200.

In this case, as described above, brightness of the edge area of the screen 12 may be low compared to brightness of the central area of the screen 12. Particularly, even though light reflectance in the edge area 230 is increased by reducing the sizes of the plurality of edge holes 330 formed in the reflective sheet 200, a total amount of light at the edges of the backlight unit 100 may become insufficient.

Therefore, there may be a limit to improving brightness of the edge area of the screen 12 to a level similar to that of the central area.

Accordingly, in one or more embodiments of the disclosure, a hole having a larger size than the size of the hole provided in the central area 210 and the size of the hole provided in the edge area 230 may be provided in the middle area 220. That is, the size of the middle hole 320 of the reflective sheet 200 may be larger than the size of the central hole 310 and the size of the edge hole 330.

More specifically, the middle hole 320 may have a larger size than the central hole 310. In other words, the central hole 310 may have a smaller size than the middle hole 320. As shown in FIG. 8, the diameter d2 of the middle hole 320 may be greater than the diameter d1 of the central hole 310.

For example, the diameter d1 of the central hole 310 may be about 4.5 mm, and the diameter d2 of the middle hole 320 may be in a range of about 4.6 mm to about 4.8 mm. However, the sizes of the central hole 310 and the middle hole 320 are not limited thereto.

In this case, light reflectance of the area where the middle hole 320 of the reflective sheet 200 is formed may be smaller than light reflectance of the area where the central hole 310 is formed.

More specifically, in the case in which the plurality of middle holes 320 are arranged over the entire of the middle area 220 and the plurality of central holes 310 are arranged over the entire of the central area 210, light reflectance of the substantially entire of the middle area 220 may be smaller than light reflectance of the substantially entire of the central area 210.

Also, the middle hole 320 may have a larger size than the edge hole 330. In other words, the edge hole 330 may have a smaller size than the middle hole 320. As shown in FIG. 8, the diameter d2 of the middle hole 320 may be greater than the diameter d3 of the edge hole 330.

For example, the diameter d3 of the edge hole 330 may be about 4.5 mm, and the diameter d2 of the middle hole 320 may be in a range of about 4.6 mm to about 4.8 mm. However, the sizes of the central hole 310 and the middle hole 320 are not limited thereto.

In this case, light reflectance of the area where the middle hole 320 of the reflective sheet 200 is formed may be smaller than light reflectance of the area where the edge hole 330 is formed.

Particularly, in the case in which the plurality of middle holes 320 are arranged over the entire of the middle area 220 and the plurality of edge holes 330 are arranged over the entire of the edge area 230, light reflectance of the substantially entire of the middle area 220 may be smaller than light reflectance of the substantially entire of the edge area 230.

By this configuration, light reflectance of the reflective sheet 200 may decrease from the central area 210 toward the edge area 230 and then again increase.

For example, the size of each hole 310 provided in the central area 210 may be equal to the size of each hole 330 provided in the edge area 230. That is, the central hole 310 and the edge hole 330 may have the same size. As shown in FIG. 8, the diameter d1 of the central hole 310 may be equal to the diameter d3 of the edge hole 330. In this case, light reflectance of the area where the edge holes 330 are formed in the reflective sheet 200 may be substantially the same as light reflectance of the area where the central holes 310 are formed. However, because a total amount of light of the area where the edge holes 330 are formed is low, the edge portion of the screen 12 may have lower brightness than the central portion, as described above.

However, according to one or more embodiments of the disclosure, because the middle area 220 may have lower light reflectance than the central area 210, brightness of a part of the screen 12 corresponding to the middle area 220 may be lower than brightness of another part of the screen 12 corresponding to the central area 210 by a certain degree. Accordingly, brightness of the screen 12 may be gradually lowered from the central area 210 to the edge area 230, and particularly, brightness uniformity in an area being adjacent to the edge area of the screen 12 may be improved. Additionally, in regard to a viewer looking at the screen 12, an effect of preventing the edge area of the screen 12 from appearing too dark compared to other parts may be provided.

As described above, the fact that the size of the middle holes 320 is larger than the size of the central holes 310 may not mean that the size of each hole 300 positioned in the middle area 220 among the plurality of holes 300 is larger than the size of each hole 300 positioned in the central area 210. For example, in the middle area 220, the middle holes 320 having a larger size than the central holes 310 and holes having substantially the same size as or a smaller size than the holes positioned in the central area 210 may be formed.

Also, as described above, the fact that the size of the middle holes 320 is larger than the size of the edge holes 330 may not mean that the size of each hole 320 positioned in the middle area 220 among the plurality of holes 300 is larger than the size of each hole 300 positioned in the edge area 230. For example, in the middle area 220, the middle holes 320 having a larger size than the edge holes 330 and holes having substantially the same size as or a smaller size than the holes positioned in the edge area 230 may be formed.

Figure 9:
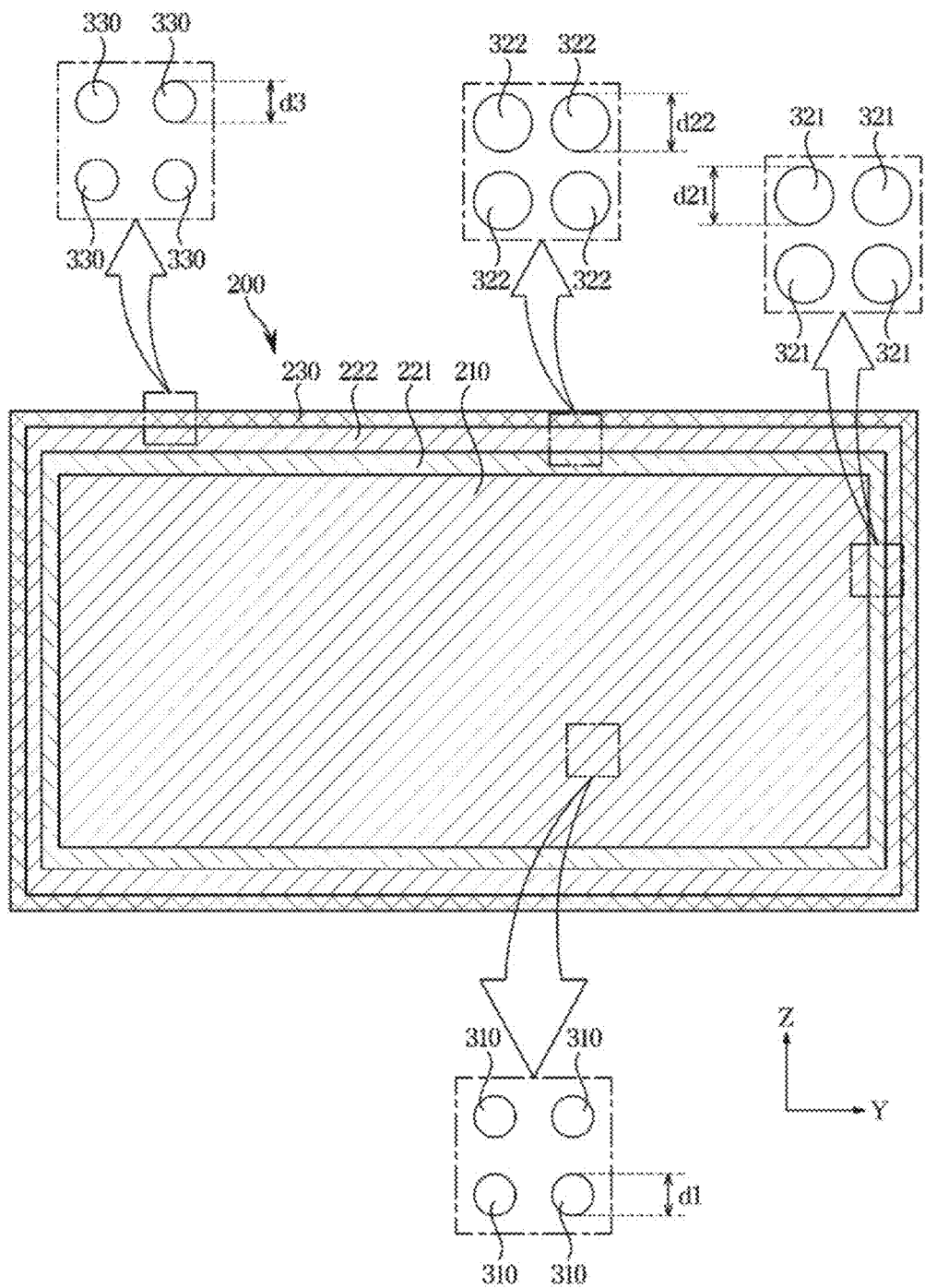
FIG. 9 shows a reflective sheet of a display apparatus according to one or more embodiments of the disclosure.

FIG. 9 shows a reflective sheet of a display apparatus according to one or more embodiments of the disclosure.

In the following descriptions about the embodiment shown in FIG. 9, the same components as those described above with reference to FIG. 8 will be assigned the same reference numerals, and descriptions about the components will be omitted.

Referring to FIG. 9, the middle area 220 provided in the reflective sheet 200 of the display apparatus 1 according to one or more embodiments of the disclosure may be partitioned into a plurality of areas.

More specifically, the middle area 220 may include a first middle area 221 and a second middle area 222.

The first middle area 221 may be provided outward from the central area 210. The first middle area 221 may be positioned closer to the edges of the reflective sheet 200 than the central area 210. The first middle area 221 may be positioned between the central area 210 and the second middle area 222 which will be described below.

The first middle area 221 may include an area among the areas on the front surface of the reflective sheet 200. In other words, the first middle area 221 may include an area located outward from the central area 210, among the areas on the surface of the reflective sheet 200 toward the display panel 20.

For example, the first middle area 221 may be formed along the circumferential direction of the reflective sheet 200. The first middle area 221 may surround the outer circumference of the central area 210. In this case, the first middle area 221 may be in a shape of a ring that substantially surrounds the circumference of the central area 210. More specifically, the first middle area 221 may be in a shape of a rectangular ring that substantially surrounds the circumference of the central area 210.

For example, the first middle area 221 may be formed symmetrically with respect to the center of the reflective sheet 200. More specifically, the first middle area 221 may be formed symmetrically with respect to the center line passing the center of the reflective sheet 200 in the vertical direction Z. Alternatively, the first middle area 221 may be formed symmetrically with respect to the center line passing the center of the reflective sheet 200 in the horizontal direction Y.

For example, the first middle area 221 may be positioned closer to the edges of the reflective sheet 200 than the center of the reflective sheet 200. Both an outer edge and an inner edge of the first middle area 221 may be positioned closer to the edges of the reflective sheet 200 than the center of the reflective sheet 200.

The second middle area 222 may be positioned outward from the first middle area 221. The second middle area 222 may be positioned closer to the edges of the reflective sheet 200 than the first middle area 221. The second middle area 222 may be positioned between the first middle area 221 and the edge area 230.

The second middle area 222 may include an area among the areas on the front surface of the reflective sheet 200. In other words, the second middle area 222 may include an area located outward from the first middle area 221, among the areas on the surface of the reflective sheet 200 toward the display panel 20.

For example, the second middle area 222 may be formed along the circumferential direction of the reflective sheet 200. The second middle area 222 may surround the edges of the first middle area 221. The second middle area 222 may surround the outer circumference of the first middle area 221. In this case, the second middle area 222 may be in a shape of a ring that substantially surrounds the circumference of the first middle area 221. More specifically, the second middle area 222 may be in a shape of a rectangular ring that substantially surrounds the circumference of the first middle area 221.

For example, the second middle area 222 may be formed symmetrically with respect to the center of the reflective sheet 200. More specifically, the second middle area 222 may be formed symmetrically with respect to the center line passing the center of the reflective sheet 200 in the vertical direction Z. Alternatively, the second middle area 222 may be formed symmetrically with respect to the center line passing the center of the reflective sheet 200 in the horizontal direction Y.

For example, the second middle area 222 may be positioned closer to the edges of the reflective sheet 200 than the center of the reflective sheet 200. Both an outer edge and an inner edge of the second middle area 222 may be positioned closer to the edges of the reflective sheet 200 than the center of the reflective sheet 200.

For example, a width of a portion of the first middle area 221 at both sides in horizontal direction Y of the first middle area 221 may be about 0.03 times a width in horizontal direction Y of the reflective sheet 200. For example, a width of a portion of the second middle area 222 at both sides in horizontal direction Y of the second middle area 222 may be about 0.06 times the width in horizontal direction Y of the reflective sheet 200.

For example, a width of a portion of the first middle area 221 at both sides in vertical direction Z of the first middle area 221 may be about 0.05 times a width in vertical direction Z of the reflective sheet 200. For example, a width of a portion of the second middle area 222 at both sides in vertical direction Z of the second middle area 222 may be about 0.1 times the width in vertical direction Z of the reflective sheet 200.

Referring to FIG. 9, the reflective sheet 200 may include a first middle hole 321. The first middle hole 321 may be a kind of a hole 300 which the light source 111 penetrates. The first middle hole 321 may be positioned outward from the central hole 310. In other words, a distance of the first middle hole 321 from the center of the reflective sheet 200 may be greater than a distance of the central hole 310 from the center of the reflective sheet 200. Also, a distance of the first middle hole 321 from the edges of the reflective sheet 200 may be smaller than a distance of the first middle hole 321 from the central hole 310.

The first middle hole 321 may be positioned in the first middle area 221. The first middle hole 321 may be formed in the first middle area 221.

For example, the first middle hole 321 may be positioned between the central hole 310 and a second middle hole 322 which will be described below. However, although the first middle hole 321 is positioned outward from the central hole 310 and the second middle hole 322 is positioned outward from the first middle hole 321, the first middle hole 321 may not be necessarily positioned between the central hole 310 and the second middle hole 322, and there may be a case in which a distance from the center of the reflective sheet 200 increases in the order of the central hole 310, the first middle hole 321, and the second middle hole 322.

As shown in FIG. 9, the first middle hole 321 may be formed in a substantially circular shape. As shown in FIG. 9, the first middle hole 321 may be in a shape of a circle having a diameter of d21.

A plurality of first middle holes 321 may be provided. That is, the reflective sheet 200 may include the plurality of first middle holes 321.

For example, the plurality of first middle holes 321 may have the same size. In other words, the plurality of first middle holes 321 may have the same area. For example, each of the plurality of first middle holes 321 may have the diameter of d21. In this case, a degree to which light reflectance of the reflective sheet 200 is reduced by each of the plurality of first middle holes 321 may be substantially the same.

The plurality of first middle holes 321 may be positioned in at least one part of the first middle area 221. The plurality of first middle holes 321 may be arranged along the outer circumference of the area where the plurality of central holes 310 are arranged in the reflective sheet 200.

For example, the plurality of first middle holes 321 may be arranged along the first middle area 221. According to the first middle area 221 being formed along the circumferential direction of the reflective sheet 200, the plurality of first middle holes 321 may be arranged along the circumferential direction of the reflective sheet 200.

For example, the plurality of first middle holes 321 having the same size may be arranged over the entire of the first middle area 221. Unlike this, the plurality of first middle holes 321 may be arranged in a part of the first middle area 221, and in another part of the first middle area 221, a hole 300 having a different size from the size of the plurality of first middle holes 321 may be positioned.

For example, each of the plurality of first middle holes 321 may be positioned closer to the edges of the reflective sheet 200 than the center of the reflective sheet 200.

The reflective sheet 200 may include the second middle hole 322. The second middle hole 322 may be a kind of a hole 330 which the light source 111 penetrates. The second middle hole 322 may be positioned outward from the first middle hole 321. In other words, a distance of the second middle hole 322 from the center of the reflective sheet 200 may be greater than the distance of the first middle hole 321 from the center of the reflective sheet 200. Also, a distance of the second middle hole 322 from the edges of the reflective sheet 200 may be smaller than the distance of the first middle hole 321 from the edges of the reflective sheet 200.

The second middle hole 322 may be positioned in the second middle area 222. The second middle hole 322 may be formed in the second middle area 222.

For example, the second middle hole 322 may be positioned between the central hole 310 and the edge hole 330. However, although the second middle hole 322 is positioned outward from the first middle hole 321 and the edge hole 330 is positioned outward from the second middle hole 322, the second middle hole 322 may not be necessarily positioned between the first middle hole 321 and the edge hole 330, and there may be a case in which a distance from the center of the reflective sheet 200 increases in the order of the first middle hole 321, the second middle hole 322, and the edge hole 330.

As shown in FIG. 9, the second middle hole 322 may have a substantially circular shape. As shown in FIG. 9, the second middle hole 322 may be formed in a shape of a circle having a diameter of d22.

A plurality of second middle holes 322 may be provided. That is, the reflective sheet 200 may include the plurality of second middle holes 322.

For example, the plurality of second middle holes 322 may have the same size. In other words, the plurality of second middle holes 322 may have the same area. For example, each of the plurality of second middle holes 322 may have a diameter of d22. In this case, a degree to which light reflectance of the reflective sheet 200 is reduced by each of the plurality of second middle holes 322 may be substantially the same.

The plurality of second middle holes 322 may be positioned in at least a part of the second middle area 222. The plurality of second middle holes 322 may be arranged along an outer circumference of the area where the plurality of first middle holes 321 are arranged in the reflective sheet 200.

For example, the plurality of second middle holes 322 may be arranged along the second middle area 222. According to the second middle area 222 being formed along the circumferential direction of the reflective sheet 200, the plurality of second middle holes 322 may be arranged along the circumferential direction of the reflective sheet 200.

For example, the plurality of second middle holes 322 having the same size may be arranged over the entire of the second middle area 222. Unlike this, for example, the plurality of second middle holes 322 may be arranged in a part of the second middle area 222, and in another part of the second middle area 222, a hole 300 having a different size from the size of the plurality of second middle holes 322 may be positioned.

For example, each of the plurality of second middle holes 322 may be positioned closer to the edges of the reflective sheet 200 than the center of the reflective sheet 200.

Each of the first middle hole 321 and the second middle hole 322 may have a larger size than the central hole 310. Also, the first middle hole 321 and the second middle hole 322 may have a larger size than the edge hole 330. As shown in FIG. 9, the diameter d21 of the first middle hole 321 and the diameter d22 of the second middle hole 322 may be respectively greater than the diameter d1 of the central hole 310 and the diameter d3 of the edge hole 330.

Herein, the second middle hole 322 may have a larger size than the first middle hole 321. In other words, the first middle hole 321 may have a smaller size than the second middle hole 322. As shown in FIG. 9, the diameter d22 of the second middle hole 322 may be greater than the diameter d21 of the first middle hole 321.

For example, the diameter d21 of the first middle hole 321 may be about 4.6 mm, and the diameter d22 of the second middle hole 322 may be about 4.8 mm. However, the sizes of the first middle hole 321 and the second middle hole 322 are not limited thereto.

In this case, light reflectance of the area where the second middle holes 322 are formed in the reflective sheet 200 may be smaller than light reflectance of the area where the first middle holes 321 are formed.

Particularly, in the case in which the plurality of first middle holes 321 are arranged over the entire of the first middle area 221 and the plurality of second middle holes 322 are arranged over the entire of the second middle area 222, light reflectance of the substantially entire of the second middle area 222 may be smaller than light reflectance of the substantially entire of the first middle area 221.

By this configuration, a brightness difference between the area corresponding to the central area 210 and the area corresponding to the first middle area 221 among the areas of the screen 12 may be relatively small compared to a brightness difference between the area corresponding to the central area 210 and the area corresponding to the second middle area 222. Accordingly, brightness of the screen 12 may be gradually lowered outward from the central area 210, and, an effect in which brightness appears to be uniform at a border of the central area of the screen 12 may be provided to a viewer.

As described above, the fact that the size of the second middle hole 322 is larger than the size of the first middle hole 321 may not mean that the size of each hole 300 positioned in the second middle area 222 among the plurality of holes 300 is necessarily larger than the size of each hole 300 positioned in the first middle area 221. For example, in the second middle area 222, the second middle holes 322 having a larger size than the first middle holes 321 and holes having substantially the same size as or a smaller size than the holes positioned in the first middle area 221 may be formed. Alternatively, for example, in the first middle area 221, the first middle holes 321 having a smaller size than the second middle holes 322 and holes having substantially the same size as or a smaller size than the holes positioned in the second middle area 222 may be formed.

Figure 10:
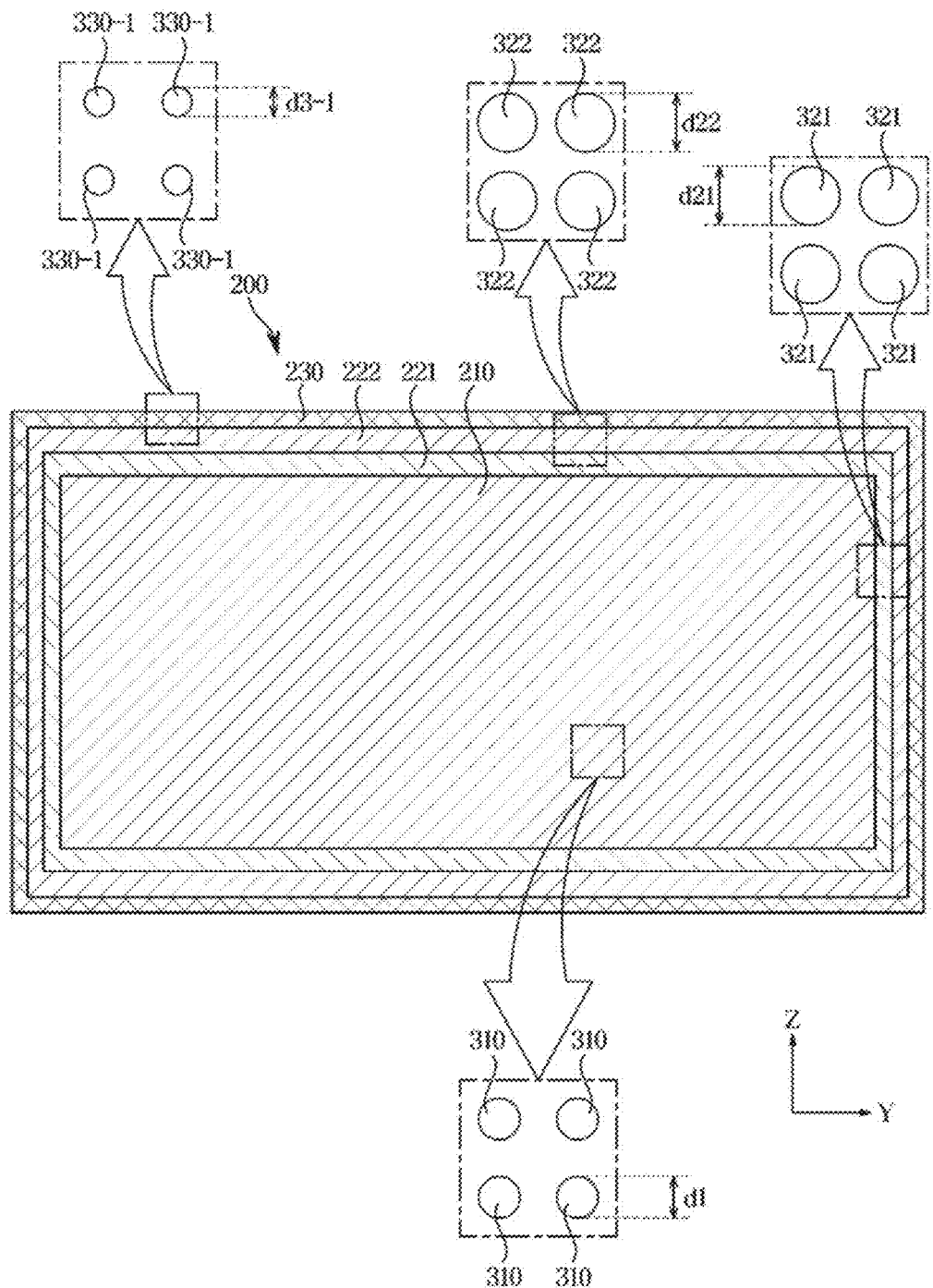
FIG. 10 shows a reflective sheet of a display apparatus according to one or more embodiments of the disclosure.

FIG. 10 shows a reflective sheet of a display apparatus according to one or more embodiments of the disclosure.

In the following descriptions about the embodiment shown in FIG. 10, the same components as those described above with reference to FIGS. 8 and 9 will be assigned the same reference numerals, and descriptions about the components will be omitted.

Referring to FIG. 10, the reflective sheet 200 of the display apparatus 1 according to one or more embodiments of the disclosure may include an edge hole 330-1. The edge hole 330-1 may be positioned in the edge area 230 of the reflective sheet 200.

Because characteristics about a position and arrangement of the edge hole 330-1 shown in FIG. 10 correspond to characteristics of the edge hole 330 described with reference to FIGS. 8 and 9, detailed descriptions thereof will be omitted.

Referring to FIG. 10, each hole 330-1 provided in the edge area 230 may have a smaller size than each hole 310 provided in the central area 210. That is, the edge hole 330-1 may have a smaller size than the central hole 310. For example, a diameter d3-1 of the edge hole 330-1 may be smaller than the diameter d1 of the central hole 310.

For example, the diameter d1 of the central hole 310 may be about 4.5 mm, and the diameter d3-1 of the edge hole 330-1 may be about 4.4 mm.

A plurality of edge holes 330-1 may be provided. For example, each of the plurality of edge holes 330-1 may have the same size. As shown in FIG. 10, each of the plurality of edge holes 330-1 may have the diameter of d3-1.

In this case, an area where the edge holes 330-1 are formed in the reflective sheet 200 may have higher light reflectance than the area where the central holes 310 are formed. Particularly, according to the edge holes 330-1 being arranged over the entire of the edge area 230, light reflectance of the substantially entire of the edge area 230 may be greater than light reflectance of the substantially entire of the central area 210.

By this configuration, in an edge area of the screen 12 corresponding to the edge area 230, light brightness may be prevented from excessively deteriorating, and total brightness uniformity of the screen 12 may be improved.

The characteristics about the size of the edge holes 330-1 described above with reference to FIG. 10 may be applied to both the case in which the plurality of middle holes 320 positioned in the middle area 220 include the first middle holes 321 positioned in the first middle area 221 and the second middle holes 322 having a different size from the size of the first middle holes 321 and positioned in the second middle area 222, and the case in which all of the plurality of middle holes 320 positioned in the middle area 220 have the same size, like the embodiment shown in FIG. 8.

Figure 11:
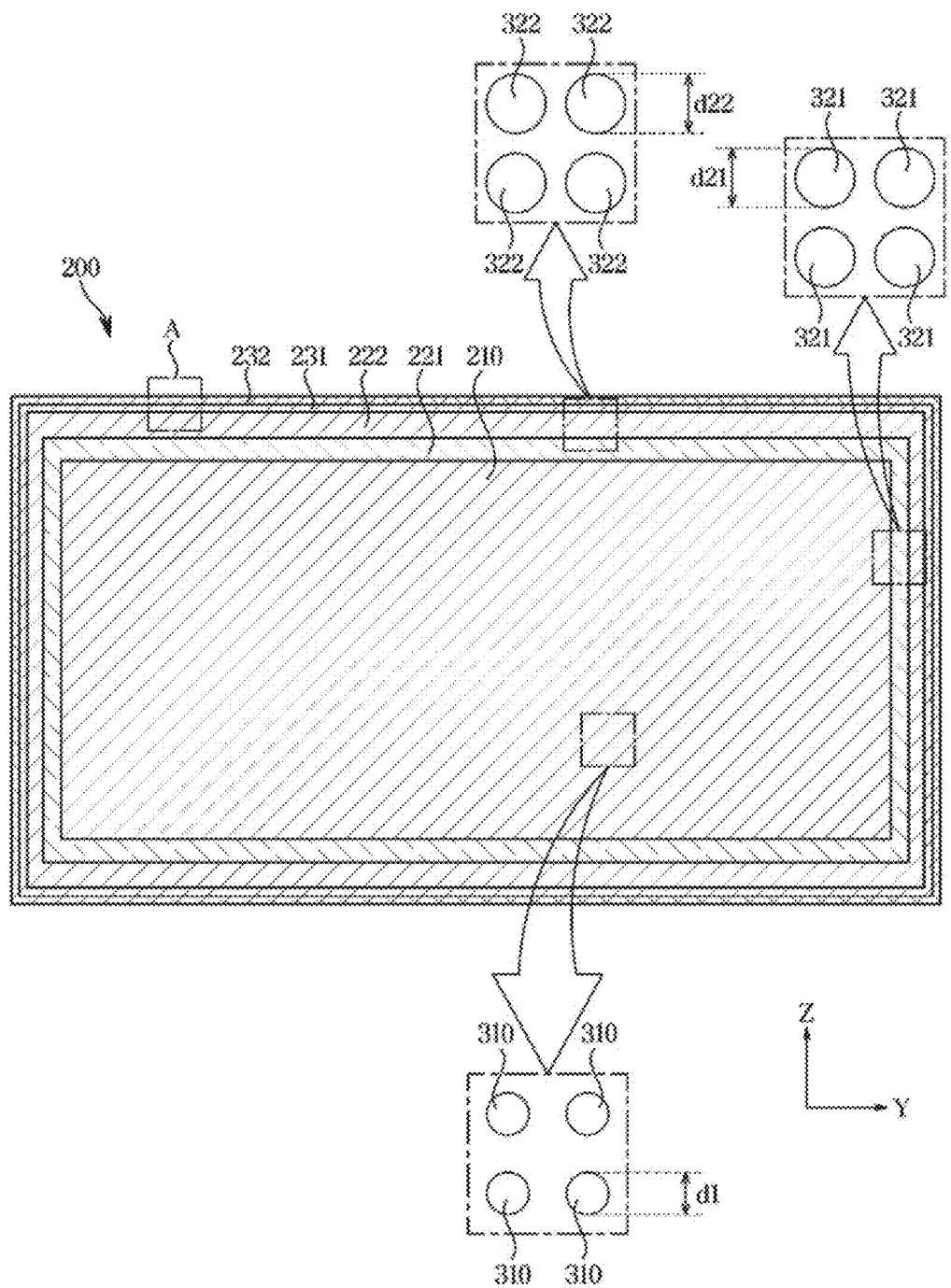
FIG. 11 shows a reflective sheet of a display apparatus according to one or more embodiments of the disclosure.
Figure 12:
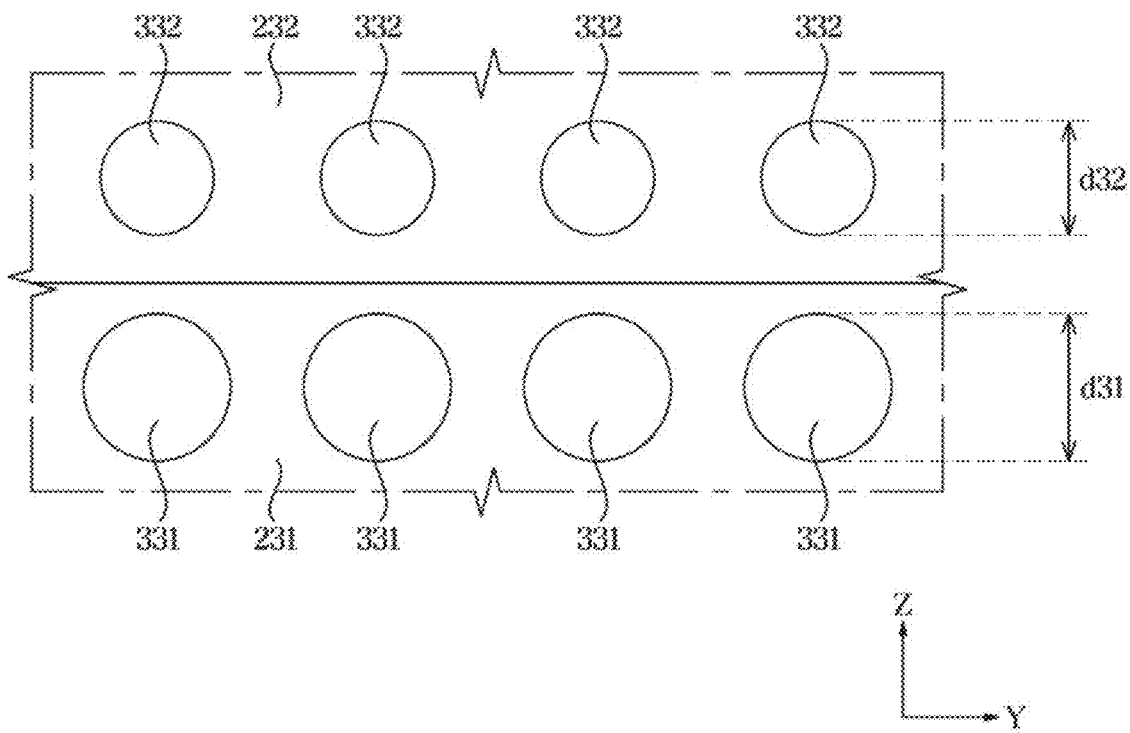
FIG. 12 is an enlarged view of an area A of FIG. 11.

FIG. 11 shows a reflective sheet of a display apparatus according to one or more embodiments of the disclosure. FIG. 12 is an enlarged view of an area A of FIG. 11.

In the following descriptions about the embodiment shown in FIGS. 11 and 12, the same components as those described above with reference to FIGS. 8 to 10 will be assigned the same reference numerals, and descriptions about the components will be omitted.

Referring to FIGS. 11 and 12, the edge area 230 provided in the reflective sheet 200 of the display apparatus 1 according to one or more embodiments of the disclosure may be partitioned into a plurality of areas.

More specifically, the edge area 230 may include a first edge area 231 and a second edge area 232.

The first edge area 231 may be provided outward from the middle area 220 (as shown in FIG. 11, the first edge area 231 is provided outward from the second middle area 222, and hereinafter, for convenience of description, the following description will be provided based on the middle area 220). The first edge area 231 may be positioned closer to the edges of the reflective sheet 200 than the middle area 220. The first edge area 231 may be positioned between the middle area 220 and the second edge area 232 which will be described below.

The first edge area 231 may include an area among the areas on the front surface of the reflective sheet 200. In other words, the first edge area 231 may include an area located outward from the middle area 220 in the areas on the surface of the reflective sheet 200 toward the display panel 20.

For example, the first edge area 231 may be formed along the circumferential direction of the reflective sheet 200. The first edge area 231 may surround the outer circumference of the middle area 220. In this case, the first edge area 231 may be in a shape of a ring that substantially surrounds the circumference of the middle area 220. More specifically, the first edge area 231 may be in a shape of a rectangular ring that substantially surrounds the circumference of the middle area 220.

For example, the first edge area 231 may be formed symmetrically with respect to the center of the reflective sheet 200. More specifically, the first edge area 231 may be formed symmetrically with respect to the center line passing the center of the reflective sheet 200 in the vertical direction Z. Alternatively, the first edge area 231 may be formed symmetrically with respect to the center line passing the center of the reflective sheet 200 in the horizontal direction Y.

For example, the first edge area 231 may be positioned closer to the edges of the reflective sheet 200 than the center of the reflective sheet 200. Both an outer edge and an inner edge of the first edge area 231 may be positioned closer to the edges of the reflective sheet 200 than the center of the reflective sheet 200.

The second edge area 232 may be positioned outward from the first edge area 231. The second edge area 232 may be positioned closer to the edges of the reflective sheet 200 than the first edge area 231. The second edge area 232 may be provided along the inner edge of the display case 11A. The second edge area 232 may be positioned adjacent to the inner edge of the display case 11A.

The second edge area 232 may include an area among the areas on the front surface of the reflective sheet 200. In other words, the second edge area 232 may include an area located outward from the first edge area 231 among the areas on the surface of the reflective sheet 200 toward the display panel 20.

For example, the second edge area 232 may be formed along the circumferential direction of the reflective sheet 200. Also, for example, the second edge area 232 may be provided along the outermost edges of the reflective sheet 200.

The second edge area 232 may extend by a preset length from the outermost edges of the reflective sheet 200. For example, the second edge area 232 may be formed with a thickness of about 0.5 cm from the outermost edges of the reflective sheet 200. Alternatively, for example, the first edge area 231 and the second edge area 232 may be formed with thicknesses corresponding to each other.

For example, the second edge area 232 may be formed along the circumferential direction of the reflective sheet 200. The second edge area 232 may surround the middle area 220. The second edge area 232 may surround an outer circumference of the middle area 220. In this case, the second edge area 232 may be in a shape of a ring that substantially surrounds the circumference of the middle area 220. More specifically, the second edge area 232 may be in a shape of a rectangular ring that substantially surrounds the circumference of the middle area 220.

For example, the second edge area 232 may be formed symmetrically with respect to the center of the reflective sheet 200. More specifically, the second edge area 232 may be formed symmetrically with respect to the center line passing the center of the reflective sheet 200 in the vertical direction Z. Alternatively, the second edge area 232 may be formed symmetrically with respect to the center line passing the center of the reflective sheet 200 in the horizontal direction Y.

Referring to FIGS. 11 and 12, the reflective sheet 200 may include a first edge hole 331. The first edge hole 331 may be a kind of a hole 300 which the light source 111 penetrates. The first edge hole 331 may be positioned outward from the middle hole 320 (as shown in FIG. 11, the first edge hole 331 is provided outward from the second middle hole 322, and hereinafter, for convenience of description, the following description will be provided based on the middle hole 320). In other words, a distance of the first edge hole 331 from the center of the reflective sheet 200 may be greater than a distance of the middle hole 320 from the center of the reflective sheet 200. Also, a distance of the first edge hole 331 from the edges of the reflective sheet 200 may be smaller than a distance of the middle hole 320 from the edges of the reflective sheet 200.

The first edge hole 331 may be positioned in the first edge area 231. The first edge hole 331 may be formed in the first edge area 231.

For example, the first edge hole 331 may be positioned between the middle hole 320 and a second edge hole 332 which will be described below. However, although the first edge hole 331 is positioned outward from the middle hole 320 and the second edge hole 332 is positioned outward from the first edge hole 331, which will be described below, the first edge hole 331 may not be necessarily positioned between the middle hole 320 and the second edge hole 332, and there may be a case in which a distance from the center of the reflective sheet 200 increases in the order of the middle hole 320, the first edge hole 331, and the second edge hole 332.

As shown in FIG. 12, the first edge hole 331 may be formed in a substantially circular shape. As shown in FIG. 11, the first edge hole 331 may be formed in a shape of a circle having a diameter of d31.

A plurality of first edge holes 331 may be provided. That is, the reflective sheet 200 may include the plurality of first edge holes 331.

For example, the plurality of first edge holes 331 may have the same size. In other words, the plurality of first edge holes 331 may have the same area. For example, each of the plurality of first edge holes 331 may have the diameter of d31. In this case, a degree to which light reflectance of the reflective sheet 200 is reduced by each of the plurality of first edge holes 331 may be substantially the same.

The plurality of first edge holes 331 may be positioned in at least one part of the first edge area 231. The plurality of first edge holes 331 may be positioned along the outer circumference of the area where the plurality of middle holes 320 are arranged in the reflective sheet 200.

For example, the plurality of first edge holes 331 may be arranged along the first edge area 231. According to the first edge area 231 being formed along the circumferential direction of the reflective sheet 200, the plurality of first edge holes 331 may be arranged along the circumferential direction of the reflective sheet 200.

For example, the plurality of first edge holes 331 having the same size may be arranged over the entire of the first edge area 231. Unlike this, for example, the plurality of first edge holes 331 may be arranged on a part of the first edge area 231, and in another part of the first edge area 231, a hole 300 having a different size from the size of the plurality of first edge holes 331 may be positioned.

For example, a distance of each of the plurality of first edge holes 331 from the edges of the reflective sheet 200 may be smaller than a distance of each of the plurality of first edge holes 331 from the center of the reflective sheet 200.

The reflective sheet 200 may include the second edge hole 332. The second edge hole 332 may be a kind of a hole 300 which the light source 111 penetrates. The second edge hole 332 may be positioned outward from the first edge hole 331. In other words, a distance of the second edge hole 332 from the center of the reflective sheet 200 may be greater than a distance of the first edge hole 331 from the center of the reflective sheet 200. Also, a distance of the second edge hole 332 from the edges of the reflective sheet 200 may be smaller than a distance of the first edge hole 331 from the edges of the reflective sheet 200. Further, the second edge hole 332 may include an outermost hole among the plurality of holes 300 formed in the reflective sheet 200.

The second edge hole 332 may be positioned in the second edge area 232. The second edge hole 332 may be formed in the second edge area 232.

As shown in FIG. 12, the second edge hole 332 may be formed in a substantially circular shape. As shown in FIG. 12, the second edge hole 332 may be formed in a shape of a circle having a diameter of d32.

A plurality of second edge holes 332 may be provided. That is, the reflective sheet 200 may include the plurality of second edge holes 332.

For example, the plurality of second edge holes 332 may have the same size. In other words, the plurality of second edge holes 332 may have the same area. For example, each of the plurality of second edge holes 332 may have the diameter of d32. In this case, a degree to which light reflectance of the reflective sheet 200 is reduced by each of the plurality of second edge holes 332 may be substantially the same.

The plurality of second edge holes 332 may be positioned in at least one part of the second middle area 222. The plurality of second edge holes 332 may be arranged along the outer circumference of the area where the plurality of first edge holes 331 are arranged in the reflective sheet 200.

For example, the plurality of second edge holes 332 may be arranged along the second edge area 232. According to the second edge area 232 being formed along the circumferential direction of the reflective sheet 200, the plurality of second edge holes 332 may be arranged along the circumferential direction of the reflective sheet 200. The plurality of second edge holes 332 may be arranged along the edges of the reflective sheet 200.

For example, the plurality of second edge holes 332 having the same size may be arranged over the entire of the second edge area 232. Unlike this, for example, the plurality of second edge holes 332 may be arranged in a part of the second edge area 232, and in another part of the second edge area 232, a hole 300 having a different size from the size of the plurality of second edge holes 332 may be positioned.

For example, a distance of each of the plurality of second edge holes 332 from the edges of the reflective sheet 200 may be smaller than a distance of each of the plurality of second edge holes 332 from the center of the reflective sheet 200.

The second edge hole 332 may have a smaller size than the first edge hole 331. In other words, the first edge hole 331 may have a larger size than the second edge hole 332. As shown in FIG. 12, the diameter d32 of the second edge hole 332 may be smaller than the diameter d31 of the first edge hole 331.

For example, the diameter d31 of the first edge hole 331 may be about 4.4 mm, and the diameter d32 of the second edge hole 332 may be about 4.3 mm. However, the sizes of the first edge hole 331 and the second edge hole 332 are not limited thereto.

In this case, light reflectance of the area where the second edge holes 332 are formed in the reflective sheet 200 may be greater than light reflectance of the area where the first edge holes 331 are formed.

Particularly, in the case in which the plurality of first edge holes 331 are arranged over the entire of the first edge area 231 and the plurality of second edge holes 332 are arranged over the entire of the second edge area 232, light reflectance of the substantially entire of the second edge area 232 may be greater than light reflectance of the substantially entire of the first edge area 231.

By this configuration, a brightness difference between the area corresponding to the second edge area 232 and the area corresponding to the first edge area 231 among the areas of the screen 12 may be reduced. Accordingly, brightness of the screen 12 may be gradually lowered outward in the edge area, and, an effect in which brightness appears to be uniform at the edge area of the screen 12 may be provided to a viewer.

For example, the first edge hole 331 may have a smaller size than the central hole 310. The diameter d31 of the first edge hole 331 may be smaller than the diameter d1 of the central hole 310, although not limited thereto. However, the first edge hole 331 may have substantially the same size as the central hole 310.

As described above, the fact that the size of the second edge hole 332 is smaller than the size of the first edge hole 331 may not mean that the size of each hole 300 positioned in the second edge area 232 among the plurality of holes 300 is necessarily smaller than the size of each hole 300 positioned in the first edge area 231. For example, in the second edge area 232, the second edge holes 332 having a smaller size than the first edge holes 331 and holes having substantially the same size as or a smaller size than the holes positioned in the first edge area 231 may be formed. Alternatively, for example, in the first edge area 231, the first edge holes 331 having a larger size than the second edge holes 332 and holes having substantially the same size as or a smaller size than the holes positioned in the second edge area 232 may be formed.

The characteristics about the first edge holes 331 and the second edge holes 332 described above with reference to FIGS. 11 and 12 may be applied to both the case in which the plurality of middle holes 320 positioned in the middle area 220 include the first middle holes 321 positioned in the first middle area 221 and the second middle holes 322 having a different size from the size of the first middle holes 321 and positioned in the second middle area 222, and the case in which all of the plurality of middle holes 320 positioned in the middle area 220 have the same size, like the embodiment shown in FIG. 8.

Figure 13:
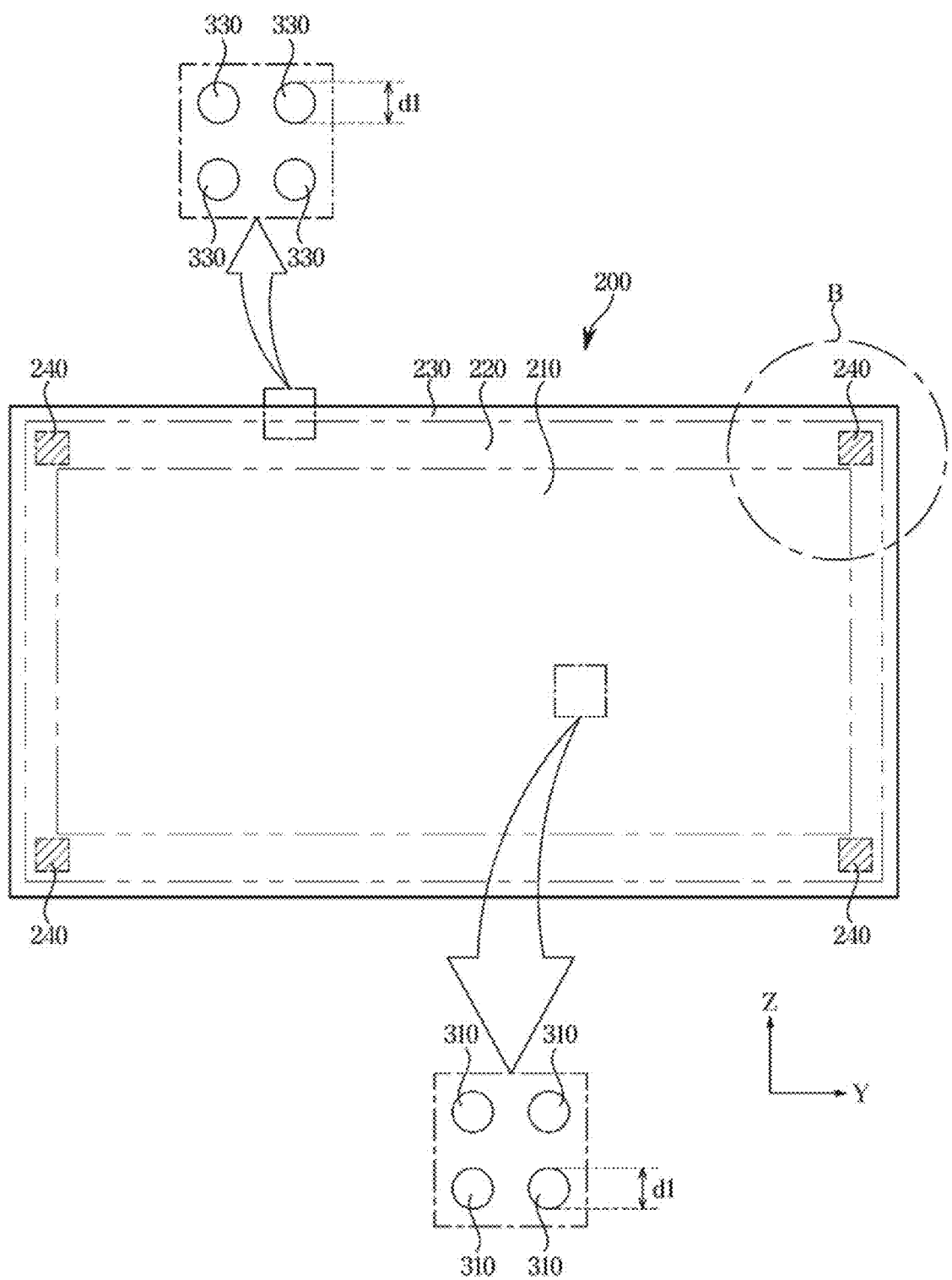
FIG. 13 shows a reflective sheet of a display apparatus according to one or more embodiments of the disclosure.
Figure 14:
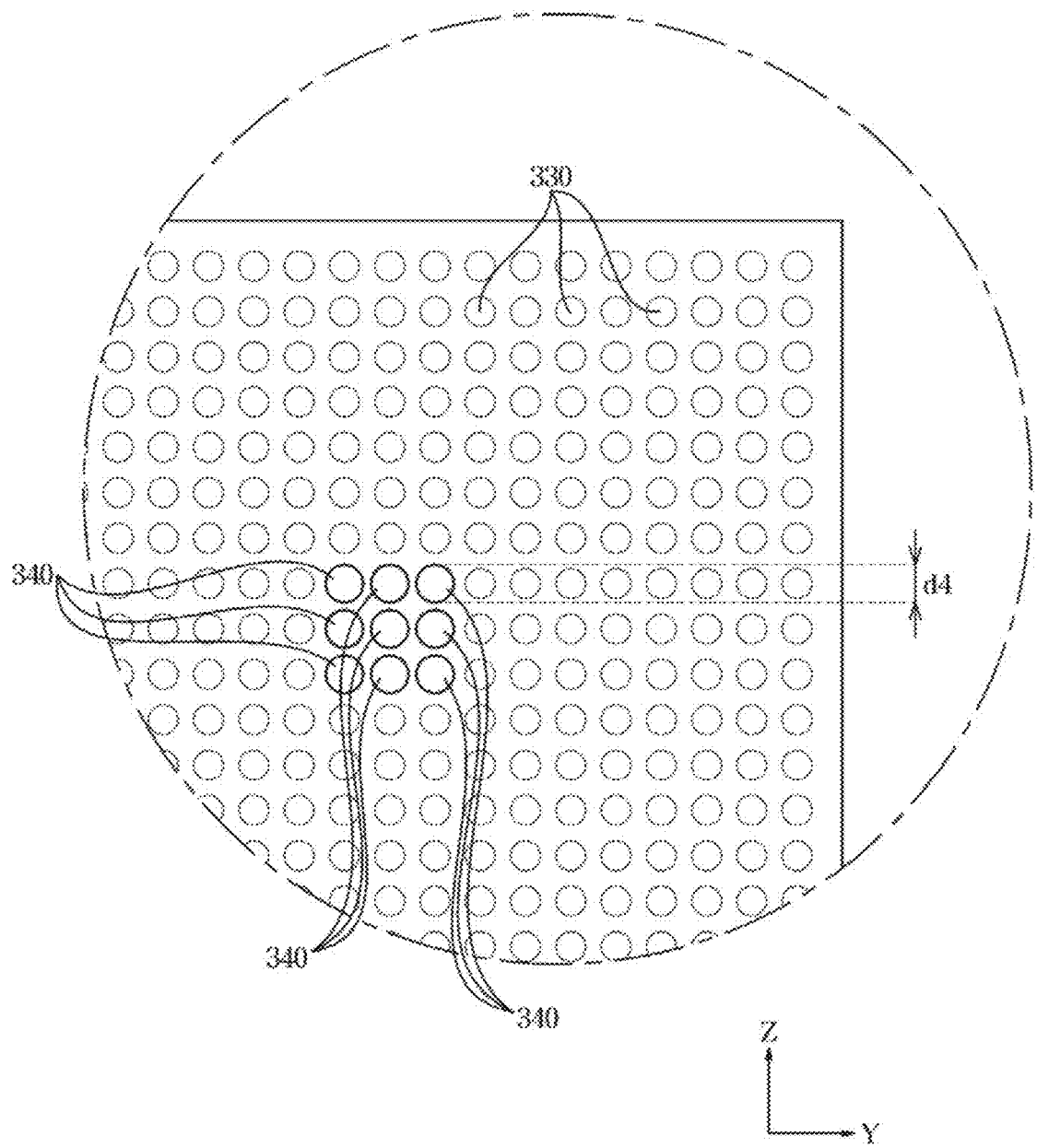
FIG. 14 is an enlarged view of an area B of FIG. 13.

FIG. 13 shows a reflective sheet of a display apparatus according to one or more embodiments of the disclosure. FIG. 14 is an enlarged view of an area B of FIG. 13.

In the following descriptions about the embodiment shown in FIGS. 13 and 14, the same components as those described above with reference to FIGS. 8 to 12 will be assigned the same reference numerals, and descriptions about the components will be omitted.

Referring to FIGS. 13 and 14, the reflective sheet 200 of the display apparatus 1 according to one or more embodiments of the disclosure may include the central area 210, the middle area 220 positioned outward from the central area 210, and the edge area 230 positioned outward from the middle area 220.

According to one or more embodiments, the middle area 220 may include a corner area 240. The corner area 240 may be positioned adjacent to a vertex of the middle area 220.

For example, as shown in FIG. 13, the middle area 220 may include four corner areas 240. The four corner areas 240 may be positioned between four vertices of the central area 210 and four vertices of the edge area 230. More specifically, each of the four corner areas 240 may be positioned between a corresponding one of the four vertices of the central area 210 and a corresponding one of the vertices of the edge area 230.

Brightness of the screen 12 at areas corresponding to four side edges of the screen 12 may be lower than at the central area of the screen 12, which has been described above. Moreover, brightness of the screen 12 at an area corresponding to a vertex of the screen 12 positioned between two sides of the display case 11A may be further reduced.

Accordingly, in the display apparatus 1 according to one or more embodiments of the disclosure, holes 300 having a uniform size may be positioned over an entire of an area excluding the corner areas 240 among the areas of the reflective sheet 200, and a corner hole 340 having a larger size may be positioned in the corner areas 240. In other words, the size of the corner hole 340 positioned in each corner area 240 may be larger than the size of holes 300 positioned in the edge area 230 and an area excluding the corner areas 240 in the central area 210 and the middle area 220. Because the corner hole 340 is positioned between the central area 210 and the edge area 230, the corner hole 340 is also referred to as a "middle hole".

More specifically, a plurality of corner holes 340 may be positioned at the four corner areas 240, respectively.

For example, the size of the central hole 310 provided in the central area 210, the size of the edge hole 330 provided in the edge area 230, and the size of the hole provided in the area excluding the four corner areas 240 in the middle area 220 may be the same.

For example, a diameter d4 of the corner hole 340 provided in the corner area 240 among the plurality of holes 300 may be about 5.5 mm, and a diameter d1 of the other holes 300 may be about 4.5 mm. However, the sizes of the holes 300 including the corner hole 340 are not limited thereto.

By this configuration, light reflectance of the corner area 240 in the reflective sheet 200 may be lowered. Accordingly, brightness may be gradually lowered outward particularly in vertex areas among the edge areas of the screen 12, and brightness uniformity may be improved within areas being adjacent to the vertices of the screen 12. Also, in regard to a viewer looking at the screen 12, an effect of preventing the vertex areas of the screen 12 from appearing too dark compared to other parts may be provided.

For example, a plurality of corner holes 340 arranged in one corner area 240 among the plurality of corner holes 340 may be arranged in rows and columns. More specifically, as shown in FIG. 14, the plurality of corner holes 340 arranged in one corner area 240 may be arranged in three columns and three rows. Herein, the columns may be parallel to the vertical direction Z of the reflective sheet 200, and the rows may be parallel to the horizontal direction Y of the reflective sheet 200.

According to the insufficient number of the plurality of corner holes 340 being arranged in one corner area 240, the effect by the disclosure may not be obtained. In contrast, according to the excessive number of the plurality of corner holes 340 being arranged in one corner area 240, light reflectance of the corner area 240 may be excessively reduced, and light reflectance of the corresponding area of the screen 12 may be excessively reduced. Accordingly, in one or more embodiments, the plurality of corner holes 340 arranged in one corner area 240 may be arranged in three columns and three rows, as shown in FIG. 14.

A display apparatus 1 according to one or more embodiments of the disclosure may include a display panel 20, a plurality of light sources 111 configured to irradiate light onto the display panel, and a reflective sheet 200 including a plurality of holes 300 according to positions of the plurality of light sources and configured to reflect light irradiated from the plurality of light sources toward the display panel. The reflective sheet may include a central area 210, a middle area 220 provided outward from the central area, and an edge area 230 provided outward from the middle area. The plurality of holes provided in the reflective sheet may include a hole 320 positioned in the middle area, wherein a size of the hole is larger than a size of a hole 310 provided in the central area and a size of a hole 330 provided in the edge area.

The middle area 220 may be provided along edges of the central area 210. The plurality of holes may include a plurality of middle holes 320 arranged along the middle area 220. A size of each of the plurality of middle holes 320 may be larger than the size of the hole 310 provided in the central area 210 and the size of the hole 330 provided in the edge area 230.

The edge area 230 may be provided along the edges of the reflective sheet 200. The plurality of holes may include a plurality of edge holes 330 arranged along the edge area 230. A size of each of the plurality of edge holes 330 may be smaller than the size of the hole 320 provided in the middle area 220.

The size of each hole 310 provided in the central area 210 and the size of each hole 330 provided in the edge area 230 may be the same.

The size of each hole 330-1 provided in the edge area 230 may be smaller than the size of each hole 310 provided in the central area 210.

The edge area 230 may be provided along the edges of the reflective sheet 200. The plurality of holes may include a plurality of edge holes 330-1 arranged along the edge area 230. A size of each of the plurality of edge holes 330-1 may be smaller than the size of the hole 310 provided in the central area 210.

The middle area 220 may include a first middle area 221, and a second middle area 222 positioned outward from the first middle area. The plurality of holes may include a first middle hole 321 provided in the first middle area 221, wherein a size of the first middle hole is larger than the size of the hole 310 provided in the central area 210 and the size of the hole provided in the edge area, and a second middle hole 322 provided in the second middle area 222, wherein a size of the second middle hole is larger than the size of the first middle hole 321.

The second middle area 222 may be positioned between the first middle area 221 and the edge area 230.

The first middle area 221 and the second middle area 222 may be provided along a circumferential direction of the reflective sheet. The second middle area 222 may surround edges of the first middle area 221. The first middle hole 321 may be arranged along the first middle area 221. The second middle hole 322 may be arranged along the second middle area 222.

The edge area 230 may include a first edge area 231, and a second edge area 232 located outward from the first edge area. The plurality of holes may include a first edge hole 331 provided in the first edge area, wherein a size of the first edge hole is smaller than the size of the hole provided in the middle area 220, and a second edge hole 332 provided in the second edge area, wherein a size of the second edge hole is smaller than the size of the first edge hole 331.

The size of the first edge hole 331 may be smaller than the size of the hole 310 provided in the central area 210.

The first edge area 231 and the second edge area 232 may be provided along a circumferential direction of the reflective sheet 200. The second edge area 232 may surround edges of the first edge area 231. The first edge hole 331 may be arranged along the first edge area 231. The second edge hole 332 may be arranged along the second edge area 232.

The middle area 220 may include four corner areas 240. Each of the four corner areas 240 may be provided between a corresponding vertex among four vertices of the central area 210 and a corresponding vertex among four vertices of the edge area 230. The plurality of holes may include a plurality of corner holes 340, wherein a size of each corner hole is larger than the size of the hole 310 provided in the central area 210 and the size of the hole 330 provided in the edge area 230, the plurality of corner holes being positioned in each of the four corner areas.

The size of the hole 310 provided in the central area 210, the size of the hole 330 provided in the edge area 230, and a size of a hole provided in an area excluding the four corner areas 240 in the middle area 220 may be the same.

A plurality of corner holes 340 arranged in a corner area 240 of the four corner areas among the plurality of corner holes 340 may be arranged in three columns and three rows.

A display apparatus 1 according to one or more embodiments of the disclosure may include a display panel 20, a plurality of light sources 111 configured to irradiate light onto the display panel, and a reflective sheet 200 including a plurality of holes 300 according to positions of the plurality of light sources and configured to reflect light irradiated from the plurality of light sources toward the display panel. The plurality of holes may include a plurality of central holes 310 positioned in a center portion of the reflective sheet, a plurality of middle holes 320 positioned outward from the plurality of central holes, wherein a size of each of the plurality of middle holes is larger than a size of a central hole among the plurality of central holes, and a plurality of edge holes 330 positioned outward from the plurality of middle holes, wherein a size of an edge hole among the plurality of edge holes is smaller than a size of a middle hole among the plurality of middle holes.

The plurality of middle holes 320 may be arranged along an outer circumference of an area where the plurality of central holes are arranged. The plurality of edge holes 330 may be arranged along an outer circumference of an area where the plurality of middle holes are arranged.

The plurality of middle holes 320 may include a plurality of first middle holes 321, and a plurality of second middle holes 322 positioned outward from the plurality of first middle holes, wherein a size of each of the plurality of second middle hole is larger than a size of a first middle hole among the plurality of first middle holes.

The plurality of edge holes 330 may include a plurality of first edge holes 331, and a plurality of second edge holes 332 positioned outward from the plurality of first edge holes, wherein a size of each of the plurality of second edge holes is smaller than a size of a first edge hole among the plurality of first edge holes.

A display apparatus 1 according to one or more embodiments of the disclosure may include a display case 11A, a plurality of light sources 111 supported by the display case, and a reflective sheet 200 including a plurality of holes 300 according to positions of the plurality of light sources and configured to reflect light emitted from the plurality of light sources, the reflective sheet being positioned inside the display case. The reflective sheet may include a central area 210, an edge area 230 provided along inner edges of the display case, and a middle area 220 positioned between the central area and the edge area. A size of a hole 320 provided in the middle area 220 may be larger than a size of a hole 310 provided in the central area 210 and a size of a hole 330 provided in the edge area 230.

According to the disclosure, because the display apparatus includes the middle holes positioned in the middle area and having a larger size than the central holes positioned in the central area and the edge holes positioned in the edge area, brightness may be gradually lowered from the center area of the screen toward the edge areas.

According to the disclosure, by including the middle holes positioned in the middle area and having the larger size than the central holes positioned in the central area and the edge holes positioned in the edge area in the display apparatus, brightness uniformity may be improved at the edge area of the screen.

According to the disclosure, by positioning, in the edge area, holes having a smaller size than the central holes, excessive brightness deterioration at the edge area of the screen may be prevented.

However, effects that can be achieved according to the concepts of the disclosure are not limited to the above-mentioned those, and other effects not mentioned may be clearly understood by one of ordinary skill in the technical art to which the disclosure belongs from the following descriptions.

So far, specific embodiments have been shown and described. However, the disclosure is not limited to the above-described embodiments, and various modifications can be made by those skilled in the art without departing from the gist of the technical idea of the disclosure defined by the claims below.

What is claimed is:

1. A display apparatus comprising:
   a display panel;
   a plurality of light sources configured to radiate light onto the display panel; and
   a reflective sheet comprising a central area, a middle area outward from the central area, an edge area outward from the middle area, and a plurality of holes corresponding to positions of the plurality of light sources,
   wherein the reflective sheet is configured to reflect the light radiated from the plurality of light sources toward the display panel,
   wherein the plurality of holes comprises a first hole in the middle area, a second hole in the central area, and a third hole in the edge area, and
   wherein a size of the first hole is larger than a size of the second hole and a size of the third hole.

2. The display apparatus of claim 1,
   wherein the middle area is along an edge of the central area,
   wherein the plurality of holes further comprises a plurality of middle holes including the first hole, wherein the plurality of middle holes are in the middle area, and
   wherein a size of each of the plurality of middle holes is larger than the size of the second hole and the size of the third hole.

3. The display apparatus of claim 1,
   wherein the edge area is along an edge of the reflective sheet,
   wherein the plurality of holes further comprises a plurality of edge holes including the third hole, wherein the plurality of edge holes are in the edge area, and
   wherein a size of each of the plurality of edge holes is smaller than the size of the first hole.

4. The display apparatus of claim 1, wherein the size of the second hole and the size of the third hole are the same.

5. The display apparatus of claim 1, wherein the size of the third hole is smaller than the size of the second hole.

6. The display apparatus of claim 5,
wherein the edge area is along an edge of the reflective sheet,
wherein the plurality of holes further comprises a plurality of edge holes including the third hole, wherein the plurality of edge holes are in the edge area, and
wherein a size of each of the plurality of edge holes is smaller than the size of the second hole.

7. The display apparatus of claim 1,
wherein the middle area comprises:
a first middle area; and
a second middle area positioned outward from the first middle area, and
wherein the plurality of holes further comprises:
a first middle hole in the first middle area, wherein a size of the first middle hole is larger than the size of the second hole and the size of the third hole; and
a second middle hole in the second middle area, wherein a size of the second middle hole is larger than the size of the first middle hole.

8. The display apparatus of claim 7, wherein the second middle area is between the first middle area and the edge area.

9. The display apparatus of claim 7,
wherein the first middle area and the second middle area are provided along a circumferential direction of the reflective sheet, and
wherein the second middle area surrounds an edge of the first middle area.

10. The display apparatus of claim 1,
wherein the edge area comprises:
a first edge area; and
a second edge area located outward from the first edge area, and
wherein the plurality of holes further comprises:
a first edge hole in the first edge area, wherein a size of the first edge hole is smaller than the size of the first hole; and
a second edge hole in the second edge area, wherein a size of the second edge hole is smaller than the size of the first edge hole.

11. The display apparatus of claim 10, wherein the size of the first edge hole is smaller than the size of the second hole.

12. The display apparatus of claim 10,
wherein the first edge area and the second edge area are provided along a circumferential direction of the reflective sheet, and
wherein the second edge area surrounds an edge of the first edge area.

13. The display apparatus of claim 1,
wherein the middle area comprises four corner areas,
wherein each of the four corner areas is provided between a corresponding vertex among four vertices of the central area and a corresponding vertex among four vertices of the edge area,
wherein the plurality of holes further comprises a plurality of corner holes positioned in the four corner areas, and
wherein a size of each of the plurality of corner holes is larger than the size of the second hole and the size of the third hole.

14. The display apparatus of claim 13,
wherein the size of the second hole, the size of the third hole, and a size of a hole in a portion of the middle area excluding the four corner areas are the same.

15. The display apparatus of claim 13, wherein each of the four corner areas comprises a corner region comprising a group of corner holes, from among the plurality of corner holes, arranged in three columns and three rows.

16. A display apparatus comprising:
a display panel;
a plurality of light sources configured to radiate light onto the display panel; and
a reflective sheet comprising:
a central area;
a middle area surrounding the central area, wherein the middle area comprises a first middle area and a second middle area, and the second middle area surrounds the first middle area;
an edge area surrounding the middle area, wherein the edge area comprises a first edge area and a second edge area, and the second edge area surrounds the first edge area; and
a plurality of holes corresponding to positions of the plurality of light sources,
wherein the reflective sheet is configured to reflect the light radiated from the plurality of light sources toward the display panel,
wherein the second middle area is between the first middle area and the edge area, and the first edge area is between the middle area and the second edge area,
wherein the plurality of holes comprises a first hole in the middle area, a second hole in the central area, and a third hole in the edge area, and
wherein a size of the first hole is larger than a size of the second hole and a size of the third hole.

17. The display apparatus of claim 16,
wherein the plurality of holes further comprises a plurality of middle holes including the first hole, wherein the plurality of middle holes are in the middle area, and
wherein a size of each of the plurality of middle holes is larger than the size of the second hole and the size of the third hole.

18. The display apparatus of claim 16,
wherein the plurality of holes further comprises a plurality of edge holes including the third hole, wherein the plurality of edge holes are in the edge area, and
wherein a size of each of the plurality of edge holes is smaller than the size of the first hole.

19. The display apparatus of claim 16,
wherein the middle area further comprises four corner areas,
wherein each of the four corner areas is provided between a corresponding vertex among four vertices of the central area and a corresponding vertex among four vertices of the edge area,
wherein the plurality of holes further comprises a plurality of corner holes positioned in the four corner areas, and
wherein a size of each of the plurality of corner holes is larger than the size of the second hole and the size of the third hole.

20. A reflective sheet comprising:
a central area, a middle area outward from the central area, an edge area outward from the middle area, and a plurality of holes corresponding to positions of a plurality of light sources of a display apparatus, wherein the reflective sheet is configured to reflect the light radiated from the plurality of light sources toward a display panel of the display apparatus, wherein the plurality of holes comprises a first hole in the middle area, a second hole in the central area, and a third hole in the edge area, and wherein a size of the first hole is larger than a size of the second hole and a size of the third hole.

\* \* \* \* \*